US012581119B2

(12) United States Patent
Guo et al.

(10) Patent No.: US 12,581,119 B2
(45) Date of Patent: Mar. 17, 2026

(54) IMAGE ENCODING AND DECODING METHOD AND APPARATUS

(71) Applicant: HUAWEI TECHNOLOGIES CO., LTD., Shenzhen (CN)

(72) Inventors: Tiansheng Guo, Beijing (CN); Jing Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/679,679

(22) Filed: May 31, 2024

(65) Prior Publication Data

US 2024/0323441 A1    Sep. 26, 2024

Related U.S. Application Data

(63) Continuation of application No. PCT/CN2022/135204, filed on Nov. 30, 2022.

(30) Foreign Application Priority Data

Dec. 3, 2021    (CN) .......................... 202111470979.5

(51) Int. Cl.
  *H04N 11/02*        (2006.01)
  *H04N 19/136*       (2014.01)
          (Continued)

(52) U.S. Cl.
  CPC ........... *H04N 19/61* (2014.11); *H04N 19/136* (2014.11); *H04N 19/147* (2014.11);
          (Continued)

(58) Field of Classification Search
  CPC .... H04N 19/61; H04N 19/136; H04N 19/147; H04N 19/184; H04N 19/124; H04N 19/13
          (Continued)

(56) References Cited

U.S. PATENT DOCUMENTS

2005/0276475 A1    12/2005    Sawada
2018/0075343 A1*    3/2018    van den Oord ......... G06F 40/44
                (Continued)

FOREIGN PATENT DOCUMENTS

CN        107736027 A        2/2018
CN        110969626 A        4/2020
                (Continued)

OTHER PUBLICATIONS

Mohammad Akbari; Jie Liang; Jingning Han; Chengjie Tu:" Learned Variable-Rate Image Compression with Residual Divisive Normalization", 2020 IEEE International Conference on Multimedia and Expo (ICME), London, 2020, total 6 pages.
                (Continued)

*Primary Examiner* — Jayanti K Patel
*Assistant Examiner* — Richard B Carter

(57)    ABSTRACT

This application provides an image encoding and decoding method and apparatus. The image encoding method in this application includes: obtaining a to-be-processed first image feature; performing non-linear transformation processing on the to-be-processed first image feature to obtain a processed image feature, where the non-linear transformation processing sequentially includes a first non-linear operation, convolution processing, and an element-wise multiplication operation; and performing encoding based on the processed image feature to obtain a bitstream. This application can avoid limitation on a convolutional parameter, to implement efficient non-linear transformation processing in an encoding/decoding network, and further improve rate-distortion performance of an image/video compression algorithm.

9 Claims, 20 Drawing Sheets

900

Obtain a to-be-processed first image feature — 901

Perform non-linear transformation processing on the first image feature to obtain a processed image feature — 902

Perform encoding based on the processed image feature to obtain a bitstream — 903

(51) Int. Cl.

| | |
|---|---|
| *H04N 19/147* | (2014.01) |
| *H04N 19/184* | (2014.01) |
| *H04N 19/61* | (2014.01) |
| *H04N 19/124* | (2014.01) |
| *H04N 19/13* | (2014.01) |

(52) U.S. Cl.
CPC ......... *H04N 19/184* (2014.11); *H04N 19/124* (2014.11); *H04N 19/13* (2014.11)

(58) Field of Classification Search
USPC .................................................... 375/240.02
See application file for complete search history.

(56) References Cited

U.S. PATENT DOCUMENTS

| | | | |
|---|---|---|---|
| 2020/0193296 A1 | 6/2020 | Dixit et al. | |
| 2021/0012181 A1 | 1/2021 | Zhu et al. | |
| 2021/0074036 A1 | 3/2021 | Fuchs et al. | |
| 2021/0109966 A1* | 4/2021 | Ayush | G06N 3/044 |
| 2021/0117687 A1 | 4/2021 | Ren et al. | |
| 2023/0334829 A1* | 10/2023 | Du | G06V 10/776 |
| 2024/0289590 A1* | 8/2024 | Cricri | G06N 3/084 |

FOREIGN PATENT DOCUMENTS

| | | |
|---|---|---|
| CN | 111243066 A | 6/2020 |
| CN | 111259904 A | 6/2020 |
| CN | 111754592 A | 10/2020 |
| CN | 113569790 A | 10/2021 |
| CN | 113709455 A | 11/2021 |
| JP | 2020028111 A | 2/2020 |
| JP | 2021520082 A | 8/2021 |
| JP | 2021522756 A | 8/2021 |
| JP | 2024532014 A | 9/2024 |
| TW | 202027033 A | 7/2020 |
| WO | 2021077620 A1 | 4/2021 |

OTHER PUBLICATIONS

Johannes Ball , Valero Laparra and Eero P. Simoncelli: "Density Modeling of Images Using Ageneralized Normalization Transformation", International Conference on Learning Representations (ICRL) , 2016, total 14 pages.

Johannes Ball : "End-to-end optimized image compression", International Conference on Learning Representations (ICRL) , Toulon, 2017, total 43 pages.

Lei Zhou, Zhenhong Sun, Xiangji Wu, Junmin Wu: "End-to-end Optimized Image Compression with Attention Mechanism", 2019, total 4 pages.

International Search Report and Written Opinion issued in PCT/CN2022/135204, dated Feb. 21, 2023, 8 pages.

Office Action issued in TW111146343, dated May 10, 2023, 7 pages.

Ge Gao et al., "Neural Image Compression via Attentional Multi-scale Back Projection and Frequency Decomposition", IEEE International Conference on Computer Vision, Oct. 10, 2021, total 10 pages,XP034092432.

Ming Lu et al., "Decomposition, Compression, and Synthesis (DCS)-based Video Coding:A Neural Exploration via Resolution-Adaptive Learning", arXiv:2012.00650v1 [cs.CV] Dec. 1, 2020, total 15 pages, XP081825519.

Tong Chen et al., "Neural Image Compression via Non-Local Attention Optimization and Improved Context Modeling", arXiv:1910.06244v1 [eess.IV] Oct. 11, 2019, total 13 pages, XP081514975.

* cited by examiner

Obtain a to-be-processed first image feature                901

Perform non-linear transformation processing on the first image feature to obtain a processed image feature                902

Perform encoding based on the processed image feature to obtain a bitstream                903

Non-linear operation

Convolution processing

Element-wise multiplication operation

1300

Obtain a to-be-processed first image feature　　1301

Perform non-linear transformation processing on the first image feature to obtain a processed image feature　　1302

Obtain a reconstructed image based on the processed image feature　　1303

IMAGE ENCODING AND DECODING METHOD AND APPARATUS

CROSS-REFERENCE TO RELATED APPLICATIONS

This application is a continuation of International Application No. PCT/CN2022/135204, filed on Nov. 30, 2022, which claims priority to Chinese Patent Application No. 202111470979.5, filed on Dec. 3, 2021. The disclosures of the aforementioned applications are hereby incorporated by reference in their entireties.

TECHNICAL FIELD

This application relates to the field of image processing technologies, and in particular, to an image encoding and decoding method and apparatus.

BACKGROUND

As a convolutional neural network (CNN) outperforms a conventional algorithm in a computer vision task such as image recognition and target detection, more researchers start to explore deep learning-based image/video compression methods. Some researchers design an end-to-end deep learning image/video compression algorithm. For example, modules such as an encoding network, an entropy estimation network, an entropy encoding network, an entropy decoding network, and a decoding network are optimized as a whole. The encoding network and the decoding network may also be referred to as a transformation module and an inverse transformation module, and generally include a convolutional layer and a non-linear transformation unit.

The non-linear transformation unit is one of basic components of the image/video compression network. A non-linear feature of the non-linear transform unit directly affects rate-distortion performance of the compression algorithm. Therefore, designing a more efficient non-linear transformation unit is crucial for further improving the rate-distortion performance of image/video compression algorithms.

SUMMARY

Embodiments of this application provide an image encoding and decoding method and apparatus, to implement efficient non-linear transformation processing in an encoding/decoding network, and further improve rate-distortion performance of an image/video compression algorithm.

According to a first aspect, an embodiment of this application provides an image encoding method, including: obtaining a to-be-processed first image feature; performing non-linear transformation processing on the first image feature to obtain a processed image feature, where the non-linear transformation processing sequentially includes a first non-linear operation, convolution processing, and an element-wise multiplication operation; and performing encoding based on the processed image feature to obtain a bitstream.

The first image feature is obtained after an encoder side obtains the to-be-processed image and converts the to-be-processed image from an image domain to a feature domain. The conversion herein may include but is not limited to: 1. convolution processing, where a convolutional layer is used to extract a feature, and convolution processing has a local receptive field and a weight sharing mechanism (that is, each filter processes an input feature in sequence); 2. extracting features by using a multi-layer perceptron (MLP) or a fully connected layer, where the extracting features by using an MLP or a fully connected layer has a global receptive field feature, and a weight is not shared; and 3. transformer processing, including matrix multiplication, MLP, and normalization processing, where transformer processing has a global receptive field feature, and has a strong long-distance capture dependency capability.

In a possible implementation, the non-linear operation is performed on each feature value in the first image feature to obtain a second image feature. The convolution processing is performed on the second image feature to obtain a third image feature, where a plurality of feature values in the third image feature correspond to a plurality of feature values in the first image feature. The element-wise multiplication operation is performed on the plurality of corresponding feature values in the first image feature and the third image feature to obtain the processed image feature.

The first non-linear operation is an operation performed on each feature value in the first image feature, and may include an absolute value operation, a rectified linear unit (ReLU) series, Sigmoid, Tanh, a piecewise linear (PWL) operation, and the like. The rectified linear unit is also referred to as a rectified linear unit.

After the first non-linear operation, the first image feature is transformed into the second image feature. The second image feature and the first image feature may be represented in the form of a matrix. Because the first non-linear operation is performed for each feature value in the first image feature, each feature value in the first image feature corresponds to one feature value in the second image feature value. Therefore, a matrix corresponding to the second image feature and a matrix corresponding to the first image feature have the same size, and feature values (values of matrix elements) at a same location correspond to each other. For example, if the first image feature is represented as a 3×3 matrix, the second image feature may also be represented as a 3×3 matrix. However, because the first non-linear operation is performed on the first image feature and the second image feature, feature values in the first image feature and the second image feature are not completely the same. Correspondingly, element values in matrices respectively corresponding to the first image feature and the second image feature are not completely the same.

Convolution processing is performed on the second image feature, to output a third image feature. The third image feature may be considered as a local response (that is, a refined value) of the second image feature. In other words, the third image feature is a response signal obtained by performing the convolution processing on the second image feature. Because a receptive field of the convolution processing is limited, a response value of each location in an image feature output after the convolution processing is related only to an input feature value of a location adjacent to the location. This is referred to as a local response.

It can be learned that a local attention mechanism is implemented after the foregoing non-linear operation, the convolution processing, and the element-wise multiplication operation. Local means that the non-linear operation is performed element-wise, and an output value is obtained for each input feature value based only on a feature of an input feature value, without considering impact of a surrounding feature value. The attention mechanism means that some of all feature values in the first image feature are important, and some are redundant. An output of the convolution processing may be a weight of each feature value in the image feature. An original feature value may be refined, an important feature value is highlighted, and a redundant feature value is suppressed. In the element-wise multiplication operation, the value of each feature value in the first image feature is refined by using the foregoing local information, and a convolution parameter does not need to be a positive number. This avoids limitation on a value range of the convolution parameter, and a better convolution parameter can be obtained in a wider value range. In this way, better image compression performance is achieved.

In a possible implementation, the non-linear transformation processing further includes an element-wise addition operation after the element-wise multiplication operation.

In a possible implementation, a non-linear operation is performed on each feature value in the first image feature to obtain a second image feature. The convolution processing is performed on the second image feature to obtain a third image feature, where a plurality of feature values in the third image feature correspond to a plurality of feature values in the first image feature. The element-wise multiplication operation is performed on the plurality of corresponding feature values in the first image feature and the third image feature to obtain a fourth image feature, where the plurality of feature values in the fourth image feature correspond to the plurality of feature values in the first image feature. The element-wise addition operation is performed on the plurality of corresponding feature values in the first image feature and the fourth image feature to obtain the processed image feature.

The element-wise addition operation is a residual structure in which a head and a tail are added, so that an encoding and decoding network that uses the foregoing processing process can converge easily during training. Convolution processing conv1(x) is similar to convolution processing conv2(x). A difference lies in that an extra 1 is added to a convolution bias parameter β in convolution processing conv2(x). In this way, the foregoing two implementations may be changed by fine-tuning a bias parameter β in convolution in the convolution processing. To be specific, if a non-linear transformation unit includes convolution processing conv1(x) and an element-wise addition operation, the convolution processing conv1(x) and the element-wise addition operation may be merged into convolution processing conv2(x), so that the element-wise addition operation is omitted. After the processed image feature is obtained, the encoder side may continue to perform the convolution processing on the processed image feature, or may perform, after the convolution processing, the non-linear transformation processing on a convolution-processed feature, and then encode a feature obtained after the foregoing processing to obtain the bitstream.

In embodiments of this application, non-linear transformation processing in an encoding network is changed, so that an output value is obtained for each input feature value based only on a feature of the input feature value, without considering impact of a surrounding feature value. In addition, an original feature value is refined, an important feature value is highlighted, and a redundant feature value is suppressed. In addition, the value of each feature value in the first image feature may be further refined, thereby avoiding limitation on the convolutional parameter, implementing efficient non-linear transformation processing in the encoding network, and further improving rate-distortion performance of an image/video compression algorithm.

The non-linear operation is an operation performed on each feature value in the first image feature, and may include using a piecewise linear mapping method. The method may be obtaining an absolute value (obtaining an absolute value of an input feature value), or may be a rectified linear unit (ReLU), or a leakage rectified linear unit (LeakyReLU), or may be a piecewise linear (PWL) operation. The ReLU is a piecewise linear mapping method. For the input feature value, a feature value less than 0 is output as 0, and a feature value greater than or equal to 0 remains the same. The LeakyReLU is a piecewise linear mapping method. Based on the ReLU, an input feature value less than 0 is scaled by using a preset weight, and the weight is usually 0.01. The PWL operation is also a piecewise linear mapping method, and a quantity of segments in the PWL operation may be greater. For a specific definition of the PWL operation, refer to the following embodiments. In addition, the non-linear operation may further include another method, for example, a piecewise non-linear operation, Tanh, or Sigmoid. This is not specifically limited in embodiments of this application.

In a possible implementation, the non-linear transformation processing further includes a second non-linear operation between the convolution processing and the element-wise multiplication operation. The second non-linear operation is the same as or different from the first non-linear operation. For example, the first non-linear operation may be an absolute value operation, and the second non-linear operation may be an absolute value operation, another piecewise linear mapping method, or another non-linear operation. Alternatively, the first non-linear operation may be the ReLU, and the second non-linear operation may be the ReLU, Sigmoid, or another non-linear operation. Alternatively, the first non-linear operation may be the LeakyReLU, and the second non-linear operation may be the LeakyReLU, Tanh, or another non-linear operation. Alternatively, the first non-linear operation may be PWL, and the second non-linear operation may be PWL or another non-linear operation. When the second non-linear operation is implemented by using PWL, piecewise linear mapping may use different segment quantities. A mapping slope on each segment may be determined through training or may be directly specified. Different piecewise linear functions may be used for each channel of an input feature image, or a same piecewise linear function may be used for all channels, or a same piecewise linear function may be used for processing several channels. In this implementation, after model training is completed, a residual structure is no longer merged with convolution, but may be merged with the piecewise linear function. To be specific, the output of an original piecewise linear function is increased by 1 to form a new piecewise linear function.

In a possible implementation, a non-linear transformation unit in a training phase may be further constructed. The non-linear transformation unit in the training phase includes a first non-linear operation layer, a convolution processing layer, an element-wise multiplication operation layer, and an element-wise addition operation layer.

Training is performed based on pre-obtained training data to obtain a trained non-linear transformation unit. The trained non-linear transformation unit is used to implement the non-linear transformation processing.

According to a second aspect, an embodiment of this application provides an image decoding method, including: obtaining a to-be-processed first image feature; performing non-linear transformation processing on the first image feature to obtain a processed image feature, where the non-linear transformation processing sequentially includes a first non-linear operation, convolution processing, and an element-wise multiplication operation; and obtaining a reconstructed image based on the processed image feature.

In a possible implementation, the performing non-linear transformation processing on the first image feature to obtain a processed image feature includes: performing the first non-linear operation on each feature value in the first image feature to obtain a second image feature; performing the convolution processing on the second image feature to obtain a third image feature, where a plurality of feature values in the third image feature correspond to a plurality of feature values in the first image feature; and performing the element-wise multiplication operation on the plurality of corresponding feature values in the first image feature and the third image feature to obtain the processed image feature.

In a possible implementation, the non-linear transformation processing further includes an element-wise addition operation.

In a possible implementation, the performing non-linear transformation processing on the first image feature to obtain a processed image feature includes: performing the first non-linear operation on each feature value in the first image feature to obtain a second image feature; performing the convolution processing on the second image feature to obtain a third image feature, where a plurality of feature values in the third image feature correspond to a plurality of feature values in the first image feature; performing the element-wise multiplication operation on the plurality of corresponding feature values in the first image feature and the third image feature to obtain a fourth image feature, where a plurality of feature values in the fourth image feature correspond to the plurality of feature values in the first image feature; and performing the element-wise addition operation on the plurality of corresponding feature values in the first image feature and the fourth image feature to obtain the processed image feature.

In a possible implementation, the non-linear operation includes piecewise linear mapping, for example, an ReLU, a LeakyReLU, PWL, and Abs. In another possible implementation, the non-linear operation includes a continuous function, for example, Tanh or Sigmoid. In another possible implementation, the non-linear operation includes a piecewise non-linear operation. For technical effects of the image decoding method provided in the second aspect and the possible implementations of the second aspect, refer to technical effects of the image encoding method provided in the first aspect and the possible implementations corresponding to the first aspect.

According to a third aspect, an embodiment of this application provides an encoding apparatus, including: an obtaining module, configured to obtain a to-be-processed first image feature; a transformation module, configured to perform non-linear transformation processing on the first image feature to obtain a processed image feature, where the non-linear transformation processing sequentially includes a first non-linear operation, convolution processing, and an element-wise multiplication operation; and an encoding module, configured to perform encoding based on the processed image feature to obtain a bitstream.

In a possible implementation, the transformation module is specifically configured to: perform the first non-linear operation on each feature value in the first image feature to obtain a second image feature; perform the convolution processing on the second image feature to obtain a third image feature, where a plurality of feature values in the third image feature correspond to a plurality of feature values in the first image feature; and perform the element-wise multiplication operation on the plurality of corresponding feature values in the first image feature and the third image feature to obtain the processed image feature.

In a possible implementation, the non-linear transformation processing further includes an element-wise addition operation after the element-wise multiplication operation.

In a possible implementation, the transformation module is specifically configured to: perform the first non-linear operation on each feature value in the first image feature to obtain a second image feature; perform the convolution processing on the second image feature to obtain a third image feature, where a plurality of feature values in the third image feature correspond to a plurality of feature values in the first image feature; perform the element-wise multiplication operation on the plurality of corresponding feature values in the first image feature and the third image feature to obtain a fourth image feature, where a plurality of feature values in the fourth image feature correspond to the plurality of feature values in the first image feature; and perform the element-wise addition operation on the plurality of corresponding feature values in the first image feature and the fourth image feature to obtain the processed image feature.

In a possible implementation, the non-linear transformation processing further includes a second non-linear operation between the convolution processing and the element-wise multiplication operation. The second non-linear operation is the same as or different from the first non-linear operation. For example, the first non-linear operation may be an absolute value operation, the second non-linear operation may still be an absolute value operation, and the second non-linear operation may also be referred to as piecewise linear mapping or another non-linear operation.

In a possible implementation, the non-linear operation includes piecewise linear mapping, for example, an ReLU, a LeakyReLU, PWL, and Abs. In another possible implementation, the non-linear operation includes a continuous function, for example, Tanh or Sigmoid. In another possible implementation, the non-linear operation includes a piecewise non-linear operation.

In a possible implementation, the apparatus further includes a training module, configured to: construct a non-linear transformation unit in a training phase, where the non-linear transformation unit in the training phase includes a first non-linear operation layer, a convolution processing layer, an element-wise multiplication operation layer, and an element-wise addition operation layer; and perform training based on pre-obtained training data to obtain a trained non-linear transformation unit, where the trained non-linear transformation unit is used to implement the non-linear transformation processing.

According to a fourth aspect, an embodiment of this application provides a decoding apparatus, including: an obtaining module, configured to obtain a to-be-processed first image feature; a transformation module, configured to perform non-linear transformation processing on the first image feature to obtain a processed image feature, where the non-linear transformation processing includes a first non-linear operation, convolution processing, and an element-wise multiplication operation; and a reconstruction module, configured to obtain a reconstructed image based on the processed image feature.

In a possible implementation, the transformation module is specifically configured to: perform the first non-linear operation on each feature value in the first image feature to obtain a second image feature; perform the convolution processing on the second image feature to obtain a third image feature, where a plurality of feature values in the third image feature correspond to a plurality of feature values in the first image feature; and perform the element-wise multiplication operation on the plurality of corresponding feature values in the first image feature and the third image feature to obtain the processed image feature.

In a possible implementation, the non-linear transformation processing further includes an element-wise addition operation after the element-wise multiplication operation.

In a possible implementation, the transformation module is specifically configured to: perform the first non-linear operation on each feature value in the first image feature to obtain a second image feature; perform the convolution processing on the second image feature to obtain a third image feature, where a plurality of feature values in the third image feature correspond to a plurality of feature values in the first image feature; perform the element-wise multiplication operation on the plurality of corresponding feature values in the first image feature and the third image feature to obtain a fourth image feature, where a plurality of feature values in the fourth image feature correspond to the plurality of feature values in the first image feature; and perform the element-wise addition operation on the plurality of corresponding feature values in the first image feature and the fourth image feature to obtain the processed image feature.

In a possible implementation, the non-linear transformation processing further includes a second non-linear operation between the convolution processing and the element-wise multiplication operation. The second non-linear operation is the same as or different from the first non-linear operation.

In a possible implementation, the non-linear operation includes piecewise linear mapping, for example, an ReLU, a LeakyReLU, PWL, and Abs. In another possible implementation, the non-linear operation includes a continuous function, for example, Tanh or Sigmoid. In another possible implementation, the non-linear operation includes a piecewise non-linear operation.

In a possible implementation, the apparatus further includes a training module, configured to: construct a non-linear transformation unit in a training phase, where the non-linear transformation unit in the training phase includes a first non-linear operation layer, a convolution processing layer, an element-wise multiplication operation layer, and an element-wise addition operation layer; and perform training based on pre-obtained training data to obtain a trained non-linear transformation unit, where the trained non-linear transformation unit is used to implement the non-linear transformation processing.

According to a fifth aspect, an embodiment of this application provides an encoder, including: one or more processors; and a non-transitory computer-readable storage medium, coupled to the processor and storing a program for execution by the processor, where when executed by the processor, the program enables the decoder to perform the method according to any one of the first aspect above.

According to a sixth aspect, an embodiment of this application provides a decoder, including: one or more processors; and a non-transitory computer-readable storage medium, coupled to the processor and storing a program for execution by the processor, where when executed by the processor, the program enables the decoder to perform the method according to any one of the second aspect above.

According to a seventh aspect, an embodiment of this application provides a computer program product including program code. When the program code is executed on a computer or a processor, the computer program product is configured to perform the method according to any one of the first aspect and the second aspect.

According to an eighth aspect, an embodiment of this application provides a computer-readable storage medium, including instructions. When the instructions are run on a computer, the computer is enabled to perform the method according to any one of the first aspect and the second aspect.

According to a ninth aspect, an embodiment of this application provides a bitstream, where the bitstream is generated by a processor by performing the method according to any one of the first aspect.

According to a tenth aspect, an embodiment of this application provides a bitstream storage apparatus, where the apparatus includes a receiver and at least one storage medium, the receiver is configured to receive a bitstream, and the at least one storage medium is configured to store the bitstream. The bitstream is a bitstream generated according to the method according to any one of the first aspect.

According to an eleventh aspect, an embodiment of this application provides a bitstream transmission apparatus, where the apparatus includes a transmitter and at least one storage medium, the at least one storage medium is configured to store a bitstream, the bitstream includes a bitstream generated by a processor according to the method according to any one of the first aspect, and the transmitter is configured to send the bitstream to another electronic device.

According to a twelfth aspect, an embodiment of this application provides a bitstream distribution system, where the system includes at least one storage medium and a streaming media device, the at least one storage medium is configured to store at least one bitstream, and the at least one bitstream includes a bitstream generated according to any one of the implementations of the first aspect. The streaming media device is configured to obtain a target bitstream from the at least one storage medium and send the target bitstream to a terminal-side device, where the streaming media device includes a content server or a content distribution server.

According to a thirteenth aspect, an embodiment of this application provides a bitstream distribution system, where the system includes: a communication interface, configured to receive a request of a user for obtaining a target bitstream; and a processor, configured to determine a storage location of the target bitstream in response to the request of the user. The communication interface is further configured to send the storage location of the target bitstream to the user, so that the user obtains the target bitstream from the storage location of the target bitstream, where the target bitstream is generated by the processor by performing the method according to any one of the first aspect.

BRIEF DESCRIPTION OF DRAWINGS

FIG. 7 is a schematic diagram of an example application scenario according to an embodiment of this application;

DESCRIPTION OF EMBODIMENTS

Figure 1A:
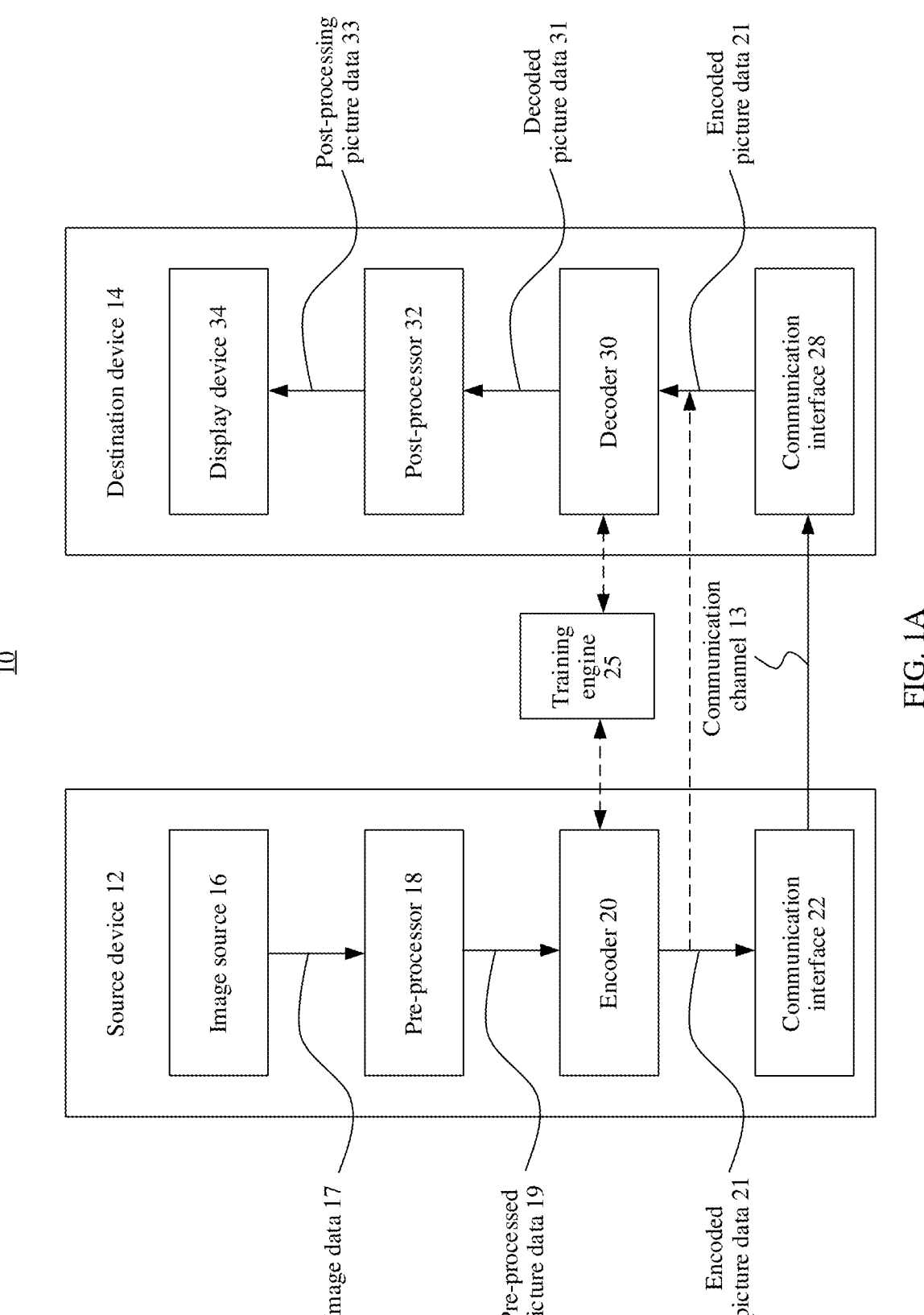
FIG. 1A is a schematic block diagram of an example coding system 10.

To make objectives, technical solutions, and advantages of this application clearer, the following clearly and completely describes the technical solutions in this application with reference to the accompanying drawings in this application. It is clear that the described embodiments are merely some rather than all of embodiments of this application. All other embodiments obtained by a person of ordinary skill in the art based on embodiments of this application without creative efforts shall fall within the protection scope of this application.

In the specification, embodiments, claims, and accompanying drawings of this application, the terms "first", "second", and the like are merely intended for distinguishing and description, and shall not be understood as indicating or implying relative importance, or indicating or implying a sequence. In addition, the terms "include", "have", and any variant thereof are intended to cover non-exclusive inclusion, for example, include a series of steps or units. For example, a method, system, product, or device is not necessarily limited to those steps or units expressly listed, but may include other steps or units not expressly listed or inherent to such a process, method, product, or device.

It should be understood that in this application, "at least one (item)" refers to one or more and "a plurality of" refers to two or more. The term "and/or" is used for describing an association relationship between associated objects, and represents that any one of three relationships may exist. For example, "A and/or B" may represent any one of the following three cases: Only A exists, only B exists, or both A and B exist, where A and B may be singular or plural. The character "/" generally indicates an "or" relationship between the associated objects. The expression "at least one of the following items (pieces)" or a similar expression means any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

Terms in embodiments of this application are described as follows.

1. Bit rate: is an average encoding length required for encoding a unit pixel in image compression.

2. Rate-distortion performance: is an indicator used to measure performance of a compression algorithm. A bit rate and decoded image distortion are considered.

3. Attention mechanism: is a means of screening high-value information from a large amount of information by using limited attention resources. A neural network can pay more attention to related parts in the input and less attention to irrelevant parts.

4. Residual structure: The residual structure is a common connection structure in a neural network, and a calculation manner may be expressed as H(x)=x+f(x). The structure can prevent gradient disappearance and gradient explosion problems that may occur when a network depth increases.

5. Non-linear transformation unit: A non-linear transformation unit is a network unit including a non-linear operation (for example, an operation such as a Rectified Linear Unit (ReLU), Sigmoid, Tanh, or PWL), and an overall calculation manner of the unit does not conform to a linear feature.

Because embodiments of this application relate to application of a neural network, for ease of understanding, the following first explains and describes related nouns or terms used in embodiments of this application.

1. Neural Network

A neural network (NN) is a machine learning model. The neural network may include neurons. The neuron may be an operation unit that uses $x_s$ and an intercept of 1 as inputs, where an output of the operation unit may be as follows:

$$h_{W,b}(x) = f(W^T x) = f\left(\sum_{s=1}^{n} W_s x_s + b\right) \tag{1-1}$$

s=1, 2, ..., or n, n is a natural number greater than 1, $W_s$ is a weight of $x_s$, and b is bias of the neuron. f is an activation function of the neuron, and is configured to introduce a non-linear feature into the neural network to convert an input signal in the neuron into an output signal. The output signal of the activation function may be used as input of a next convolutional layer. The activation function may be a non-linear function such as ReLU. The neural network is a network formed by connecting many single neurons together. To be specific, an output of a neuron may be an input of another neuron. An input of each neuron may be connected to a local receptive field of a previous layer to extract a feature of the local receptive field. The local receptive field may be a region including several neurons.

2. Multi-Layer Perceptron (MLP)

An MLP is a simple deep neural network (DNN) (different layers are fully connected), and is also referred to as a multi-layer neural network. The MLP may be understood as a neural network with a plurality of hidden layers. There is no special measurement criterion for "a plurality of" herein. The DNN is divided based on locations of different layers, and a neural network in the DNN may be divided into three types: an input layer, a hidden layer, and an output layer. Generally, the first layer is the input layer, the last layer is the output layer, and the middle layer is the hidden layer. Layers are fully connected. To be specific, any neuron at an $i^{th}$ layer is necessarily connected to any neuron at an $(i+1)^{th}$ layer. Although the DNN seems complex, it is not complex in terms of work at each layer. Simply speaking, the DNN is the following linear relationship expression: $\vec{y}=\alpha(W\vec{x}+\vec{b})$, where $\vec{x}$ is an input vector, $\vec{y}$ is an output vector, $\vec{b}$ is an offset vector, W is a weight matrix (also referred to as a coefficient), and $\alpha(\ )$ is an activation function. At each layer, only such a simple operation is performed on the input vector $\vec{x}$ to obtain the output vector $\vec{y}$. Because the DNN includes a large quantity of layers, there are a large quantity of coefficients W and a large quantity of offset vectors $\vec{b}$. Definitions of these parameters in the DNN are as follows: The coefficient W is used as an example. It is assumed that in a three-layer DNN, a linear coefficient from a fourth neuron at a second layer to a second neuron at a third layer is defined as $w_{24}{}^3$. The superscript 3 represents the layer where the coefficient W is located, and the subscript corresponds to an output third-layer index 2 and an input second-layer index 4. In conclusion, a coefficient from a $k^{th}$ neuron at a $(L-1)^{th}$ layer to a $j^{th}$ neuron at a $L^{th}$ layer is defined as $W_{jk}{}^L$. It should be noted that there is no parameter W at the input layer. In the deep neural network, more hidden layers make the network more capable of describing a complex case in the real world. Theoretically, a model with more parameters has higher complexity and a larger "capacity". It indicates that the model can complete a more complex learning task. Training the deep neural network is a process of learning a weight matrix, and a final objective of the training is to obtain a weight matrix of all layers of the trained deep neural network (a weight matrix formed by vectors W at many layers).

3 Convolutional Neural Network

A convolutional neural network (CNN) is a deep neural network with a convolutional structure, and a deep learning architecture. In the deep learning architecture, multi-layer learning is performed at different abstract levels according to a machine learning algorithm. As a deep learning architecture, the CNN is a feed-forward artificial neural network. Neurons in the feed-forward artificial neural network may respond to an image input into the neural network. The convolutional neural network includes a feature extractor constituted by a convolutional layer and a pooling layer. The feature extractor may be considered as a filter. A convolution process may be considered as using a trainable filter to perform convolution on an input image or a convolutional feature plane (feature map).

The convolutional layer is a neuron layer that is in the convolutional neural network and at which convolution processing is performed on an input signal. The convolutional layer may include a plurality of convolution operators. The convolution operator is also referred to as a kernel. In image processing, the convolution operator functions as a filter that extracts specific information from an input image matrix. The convolution operator may be a weight matrix essentially, and the weight matrix is usually predefined. In a process of performing a convolution operation on an image, the weight matrix is usually used to process pixels at a granularity of one pixel (or two pixels, depending on a value of a stride stride) in a horizontal direction on the input image, to extract a specific feature from the image. A size of the weight matrix should be related to a size of the image. It should be noted that a depth dimension of the weight matrix is the same as a depth dimension of the input image. During a convolution operation, the weight matrix extends to an entire depth of the input image. Therefore, a convolutional output of a single depth dimension is generated through convolution with a single weight matrix. However, in most cases, a single weight matrix is not used, but a plurality of weight matrices with a same size (rows×columns), namely, a plurality of same-type matrices, are applied. Outputs of the weight matrices are stacked to form a depth dimension of a convolutional image. The dimension herein may be understood as being determined based on the foregoing "plurality". Different weight matrices may be used to extract different features from the image. For example, one weight matrix is used to extract edge information of the image, another weight matrix is used to extract a specific color of the image, and still another weight matrix is used to blur unnecessary noise in the image. Sizes of the plurality of weight matrices (rows×columns) are the same. Sizes of feature maps extracted from the plurality of weight matrices with the same size are also the same, and then the plurality of extracted feature maps with the same size are combined to form an output of the convolution operation. Weight values in these weight matrices need to be obtained through massive training in actual application. Each weight matrix formed by using the weight values obtained through training may be used to extract information from the input image, to enable the convolutional neural network to perform correct prediction. When the convolutional neural network has a plurality of convolutional layers, a relatively large quantity of general features are usually extracted at an initial convolutional layer. The general feature may also be referred to as a low-level feature. As a depth of the convolutional neural network increases, a feature extracted at a subsequent convolutional layer is more complex, for example, a high-level semantic feature. A feature with higher-level semantics is more applicable to a to-be-resolved problem.

A quantity of training parameters often needs to be reduced. Therefore, a pooling layer often needs to be periodically introduced after a convolutional layer. One convolutional layer may be followed by one pooling layer, or a plurality of convolutional layers may be followed by one or more pooling layers. During image processing, the pooling layer is only used to reduce a space size of the image. The pooling layer may include an average pooling operator and/or a maximum pooling operator, to perform sampling on the input image to obtain an image with a small size. The average pooling operator may be used to calculate pixel values in the image in a specific range, to generate an average value. The average value is used a result of average pooling. The maximum pooling operator may be used to select a pixel with a maximum value in a specific range as a maximum pooling result. In addition, similar to that the size of the weight matrix at the convolutional layer needs to be related to the size of the image, an operator at the pooling layer also needs to be related to the size of the image. A size of a processed image output from the pooling layer may be less than a size of an image input to the pooling layer. Each pixel in the image output from the pooling layer represents an average value or a maximum value of a corresponding sub-region of the image input to the pooling layer.

After processing performed at the convolutional layer/pooling layer, the convolutional neural network is not ready to output required output information, because as described above, at the convolutional layer/pooling layer, only a feature is extracted, and parameters resulting from the input image are reduced. However, to generate final output information (required class information or other related information), the convolutional neural network needs to use the neural network layer to generate an output of one required class or a group of required classes. Therefore, the convolutional neural network layer may include a plurality of hidden layers. Parameters included in the plurality of hidden layers may be obtained through pre-training based on related training data of a specific task type. For example, the task type may include image recognition, image classification, and super-resolution image reconstruction.

Optionally, at the neural network layer, the plurality of hidden layers are followed by the output layer of the entire convolutional neural network. The output layer has a loss function similar to a categorical cross entropy, and the loss function is specifically used to calculate a prediction error. Once forward propagation of the entire convolutional neural network is completed, back propagation is started to update a weight value and a deviation of each layer mentioned above, to reduce a loss of the convolutional neural network and an error between a result output by the convolutional neural network by using the output layer and an ideal result.

4. Recurrent Neural Network

A recurrent neural network (RNN) is used to process sequence data. In a conventional neural network model, layers from an input layer to a hidden layer and to an output layer are fully connected, and nodes at each layer are not connected. Such a common neural network resolves many problems, but is still incapable of resolving many other problems. For example, to predict a next word in a sentence, a previous word usually needs to be used, because the previous word and the next word in the sentence are not independent. A reason why the RNN is referred to as the recurrent neural network is that a current output of a sequence is also related to a previous output of the sequence. A specific representation form is that the network memorizes previous information and applies the previous information to calculation of the current output. To be specific, nodes at the hidden layer are connected, and an input of the hidden layer not only includes an output of the input layer, but also includes an output of the hidden layer at a previous moment. Theoretically, the RNN can process sequence data of any length. Training for the RNN is the same as training for a conventional CNN or DNN. An error back propagation algorithm is also used, but there is a difference: If the RNN is expanded, a parameter such as W of the RNN is shared. This is different from the conventional neural network described in the foregoing example. In addition, during use of a gradient descent algorithm, an output in each step depends not only on a network in a current step, but also on a network status in several previous steps. The learning algorithm is referred to as a back propagation through time (BPTT) algorithm.

Why is the recurrent neural network still required when the convolutional neural network is available? A reason is simple. In the convolutional neural network, there is a premise that elements are independent of each other, and input and output are also independent, such as a cat and a dog. However, in the real world, a plurality of elements are interconnected. For example, stocks change over time. For another example, a person says: "I love traveling, and my favorite place is Yunnan. I will go there when I have a chance." Herein, people should know that the person will go to "Yunnan". Because people perform inference from the context. However, how do machines do that? Then, the RNN emerges. The RNN is intended to make the machine capable of memorizing like a human. Therefore, an output of the RNN needs to depend on current input information and historical memorized information.

5. Loss Function

In a process of training the deep neural network, because it is expected that an output of the deep neural network is as much as possible close to a predicted value that is actually expected, a predicted value of a current network and a target value that is actually expected may be compared, and then a weight vector of each layer of the neural network is updated based on a difference between the predicted value and the target value (certainly, there is usually an initialization process before the first update, to be specific, parameters are preconfigured for all layers of the deep neural network). For example, if the predicted value of the network is large, the weight vector is adjusted to decrease the predicted value, and adjustment is continuously performed, until the deep neural network can predict the target value that is actually expected or a value that is close to the target value that is actually expected. Therefore, "how to obtain, through comparison, a difference between the predicted value and the target value" needs to be predefined. This is a loss function or an objective function. The loss function and the objective function are important equations that measure the difference between the predicted value and the target value. The loss function is used as an example. A higher output value (loss) of the loss function indicates a larger difference. Therefore, training of the deep neural network is a process of minimizing the loss as much as possible.

6. Back Propagation Algorithm

The convolutional neural network may correct a value of a parameter in an initial super-resolution model in a training process according to an error back propagation (BP) algorithm, so that an error loss of reconstructing the super-resolution model becomes smaller. Specifically, an input signal is transferred forward until an error loss occurs at an output, and the parameter in the initial super-resolution model is updated based on back propagation error loss information, to make the error loss converge. The back propagation algorithm is an error-loss-centered back propagation motion intended to obtain a parameter, such as a weight matrix, of an optimal super-resolution model.

7. Generative Adversarial Network

A generative adversarial network (GAN) is a deep learning model. The model includes at least two modules: One module is a generative model, and the other module is a discriminative model. The two modules are used to learn through gaming with each other, to generate a better output. Both the generative model and the discriminative model may be neural networks, and may specifically be deep neural networks or convolutional neural networks. A basic principle of the GAN is as follows: Using a GAN for generating a picture as an example, it is assumed that there are two networks: G (Generator) and D (Discriminator). G is a network for generating a picture. G receives random noise z, and generates the picture by using the noise, where the picture is denoted as G(z). D is a discriminator network used to determine whether a picture is "real". An input parameter of D is x, x represents a picture, and an output D(x) represents a probability that x is a real picture. If a value of D(x) is 1, it indicates that the picture is 100% real. If the value of D(x) is 0, it indicates that the picture cannot be real. In a process of training the generative adversarial network, an objective of the generative network G is to generate a picture that is as real as possible to deceive the discriminative network D, and an objective of the discriminative network D is to distinguish between the picture generated by G and a real picture as much as possible. In this way, a dynamic "gaming" process, to be specific, "adversary" in the "generative adversarial network", exists between G and D. A final gaming result is that in an ideal state, G may generate an image G(z) that is to be difficultly distinguished from a real image, and it is difficult for D to determine whether the image generated by G is real, to be specific, D(G(z))=0.5. In this way, an excellent generative model G is obtained, and can be used to generate a picture.

As a convolutional neural network (CNN) outperforms a conventional algorithm in a computer vision task such as image recognition and target detection, more researchers start to explore deep learning-based image/video compression methods. Some researchers design an end-to-end deep learning image/video compression algorithm. For example, modules such as an encoding network, an entropy estimation network, an entropy encoding network, an entropy decoding network, and a decoding network are optimized as a whole. The encoding network and the decoding network may also be referred to as a transformation module and an inverse transformation module, and generally include a convolutional layer and a non-linear transformation unit.

FIG. 1A is a schematic block diagram illustrating an example coding system 10, for example, a video coding system 10 (or a coding system 10 for short) that may utilize techniques of this application. The video encoder 20 (or the encoder 20 for short) and the video decoder 30 (or the decoder 30 for short) of the video coding system 10 represent examples of devices that may be configured to perform techniques in accordance with various examples described in this application.

As shown in FIG. 1A, the coding system 10 includes a source device 12 configured to provide encoded image data 21 for example, to a destination device 14 for decoding the encoded image data 21.

The source device 12 includes an encoder 20, and may additionally, that is, optionally, include an image source 16, a pre-processor (or pre-processing unit) 18, for example, an image pre-processor 18, and a communication interface (or communication unit) 22.

The image source 16 may include or be any kind of image capturing device, for example a camera for capturing a real-world image, and/or any type of an image generating device, for example a computer-graphics processing unit for generating a computer animated image, or any type of other device for obtaining and/or providing a real-world image, a computer generated image (for example, a screen content, a virtual reality (VR) image) and/or any combination thereof (for example, an augmented reality (AR) image). The image source may be any type of memory or storage storing any of the aforementioned images.

In order to distinguish processing performed by the pre-processor (or the pre-processing unit) 18, the image (or image data) 17 may also be referred to as a raw (or raw image data) 17.

Pre-processor 18 is configured to receive the (raw) image data 17 and to perform pre-processing on the image data 17 to obtain a pre-processed image (or pre-processed image data) 19. Pre-processing performed by the pre-processor 18 may, for example, include trimming, color format conversion (for example, from RGB to YCbCr), color correction, or de-noising. It may be understood that the pre-processing unit 18 may be optional component.

The video encoder 20 is configured to receive the pre-processed image data 19 and provide encoded image data 21 (further details are described below, for example, based on FIG. 2).

A communication interface 22 of the source device 12 may be configured to receive the encoded image data 21 and to transmit the encoded image data 21 (or any further processed version thereof) over communication channel 13 to another device, for example, the destination device 14 or any other device, for storage or direct reconstruction.

The destination device 14 includes a decoder 30 (for example, a video decoder 30), and may additionally, that is, optionally, include a communication interface (or communication unit) 28, a post-processor 32 (or post-processing unit), and a display device 34.

The communication interface 28 of the destination device 14 is configured to receive the encoded image data 21 (or any further processed version thereof), for example, directly from the source device 12 or from any other source, for example, a storage device, for example, an encoded image data storage device, and provide the encoded image data 21 to the decoder 30.

The communication interface 22 and the communication interface 28 may be configured to transmit or receive the encoded image data (or encoded data) 21 via a direct communication link between the source device 12 and the destination device 14, for example, a direct wired or wireless connection, or via any kind of network, for example, a wired or wireless network or any combination thereof, or any kind of private and public network, or any kind of combination thereof.

The communication interface 22 may be, for example, configured to package the encoded image data 21 into an appropriate format, for example, packets, and/or process the encoded image data using any kind of transmission encoding or processing for transmission over a communication link or communication network.

The communication interface 28, forming the counterpart of the communication interface 22, may be, for example, configured to receive the transmitted data and process the transmission data using any type of corresponding transmission decoding or processing and/or de-packaging to obtain the encoded image data 21.

Both a communication interface 22 and a communication interface 28 may be configured as unidirectional communication interfaces as indicated by the arrow for the communication channel 13 in FIG. 1A pointing from the source device 12 to the destination device 14, or bi-directional communication interfaces, and may be configured, for example, to send and receive messages, for example, to set up a connection, to acknowledge and exchange any other information related to the communication link and/or data transmission, for example, encoded image data transmission.

The video decoder 30 is configured to receive the encoded image data 21 and provide decoded image data (or decoded image) 31 (further details will be described below, for example, based on FIG. 3).

The post-processor 32 is configured to post-process the decoded image data 31 (also called reconstructed image data), for example, the decoded image, to obtain post-processed image data 33, for example, a post-processed image. The post-processing performed by the post-processing unit 32 may include, for example, color format conversion (for example, from YCbCr to RGB), color correction, trimming, or re-sampling, or any other processing, for example, for preparing the decoded image data 31 for display, for example, by display device 34.

The display device 34 is configured to receive the post-processed image data 33 for displaying the image, for example, to a user or viewer. The display device 34 may be or include any type of display for representing the reconstructed image, for example, an integrated or external display or monitor. For example, the display may include a liquid crystal display (LCD), an organic light emitting diode (OLED) display, a plasma display, a projector, a micro LED display, a liquid crystal on silicon (LCoS), a digital light processor (DLP), or any type of other display.

The coding system 10 further includes a training engine 25. The training engine 25 is configured to train the encoder 20 or the decoder 30 to implement conversion between an image domain and a feature domain.

In embodiments of this application, the training data may be stored in a database (not shown), and the training engine 25 performs training based on the training data to obtain an encoding/decoding network. It should be noted that a source of the training data is not limited in embodiments of this application. For example, the training data may be obtained from a cloud or another place to perform model training.

Although FIG. 1A shows that the source device 12 and the destination device 14 are independent devices, the device embodiment may also include both the source device 12 and the destination device 14 or include functions of both the source device 12 and the destination device 14, that is, include both the source device 12 or a corresponding function and the destination device 14 or a corresponding function. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
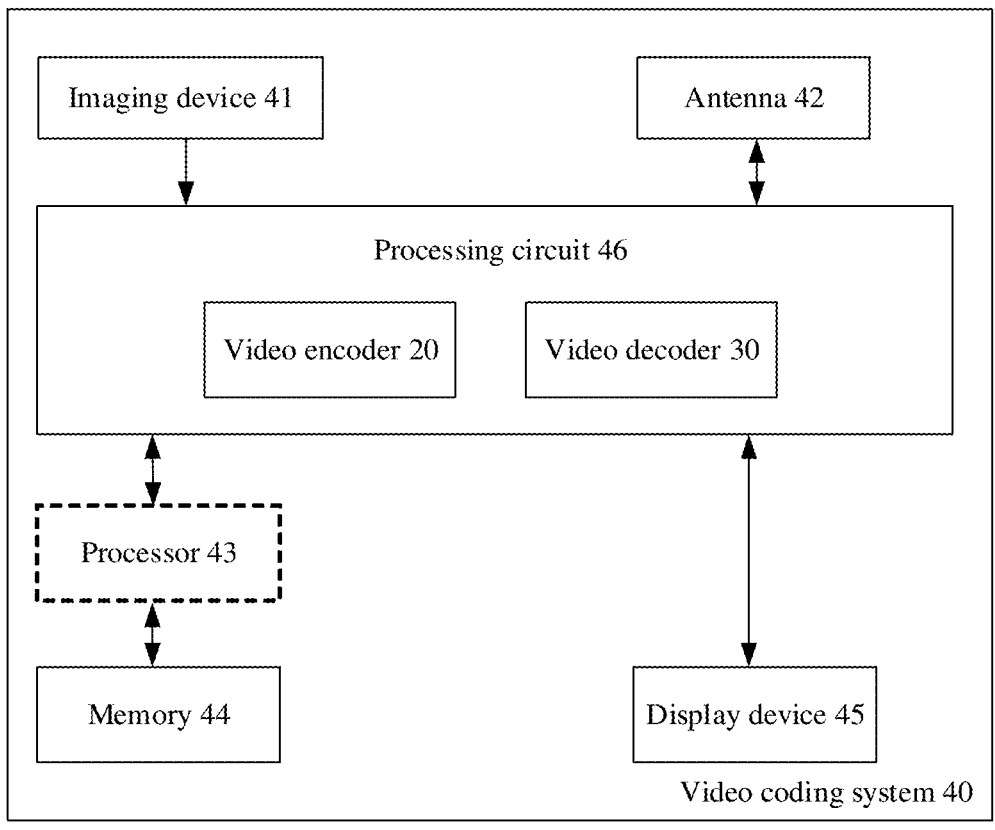
FIG. 1B is a schematic diagram of an example video coding system 40.
Figure 8:
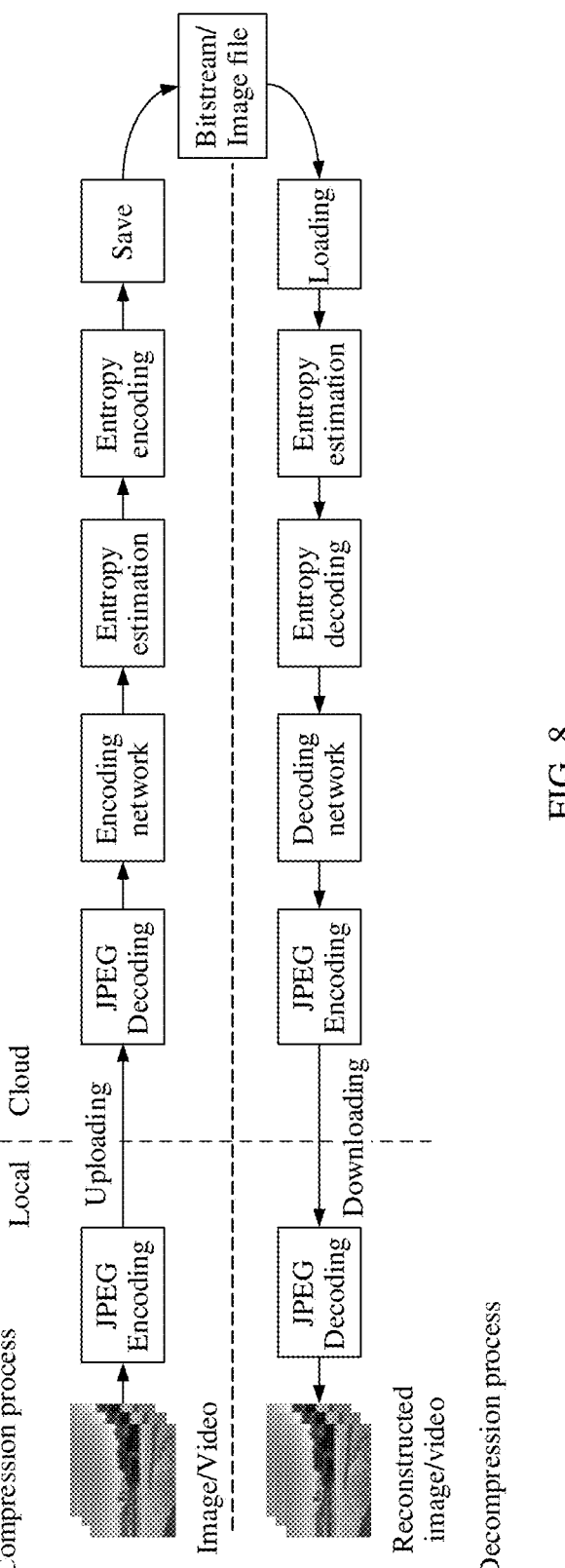
FIG. 8 is a schematic diagram of an example application scenario according to an embodiment of this application.

The encoder 20 (for example, the video encoder 20) or the decoder 30 (for example, the video decoder 30) or both the encoder 20 and the decoder 30 may be implemented via processing circuit as shown in FIG. 1B, such as one or more microprocessors, digital signal processors (DSPs), application-specific integrated circuits (ASICs), field-programmable gate arrays (FPGAs), discrete logic, hardware, video encoding dedicated or any combinations thereof. The encoder 20 may be implemented via a processing circuit 46 to embody the various modules as discussed with respect to the encoder 20 of FIG. 2 and/or any other encoder system or subsystem described herein. The decoder 30 may be implemented via the processing circuit 46 to embody the various modules as discussed with respect to the decoder 30 of FIG. 3 and/or any other decoder system or subsystem described herein. The processing circuit 46 may be configured to perform the various operations as discussed later. As shown in FIG. 8, if the techniques are implemented partially in software, a device may store instructions for the software in a suitable, non-transitory computer-readable storage medium and may execute the instructions in hardware using one or more processors to perform the techniques of the present invention. Either of the video encoder 20 and the video decoder 30 may be integrated as part of a combined encoder/decoder (CODEC) in a single device, for example, as shown in FIG. 1B.

The source device 12 and the destination device 14 may include any of a wide range of devices, including any type of handheld or stationary devices, for example, notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any type of operating system. In some cases, the source device 12 and the destination device 14 may be equipped for wireless communication. Therefore, the source device 12 and the destination device 14 may be wireless communication devices.

In some cases, the video coding system 10 illustrated in FIG. 1A is merely an example and the techniques of this application may apply to video encoding settings (for example, video encoding or video decoding) that do not necessarily include any data communication between the encoding and decoding devices. In other examples, data is retrieved from a local memory, sent over a network, or the like. A video encoding device may encode data and store encoded data into the memory, and/or a video decoding device may retrieve data from the memory and decode the data. In some examples, encoding and decoding are performed by devices that do not communicate with each other, but simply encode data into a memory and/or retrieve data from the memory and decode the data.

FIG. 1B is a schematic diagram of an example video coding system 40. The video coding system 40 may include an imaging device 41, the video encoder 20, the video decoder 30 (and/or a video encoder/decoder implemented by the processing circuit 46), an antenna 42, one or more processors 43, one or more memories 44, and/or a display device 45.

As shown in FIG. 1B, the imaging device 41, the antenna 42, the processing circuit 46, the video encoder 20, the video decoder 30, the processor 43, the memory 44, and/or the display device 45 can communicate with each other. The video coding system 40 may include only the video encoder 20 or only the video decoder 30 in different examples.

In some examples, the antenna 42 may be configured to transmit or receive an encoded bitstream of video data. Further, in some examples, the display device 45 may be configured to present the video data. The processing circuit 46 may include application-specific integrated circuit (ASIC) logic, a graphics processing unit, a general-purpose processor, or the like. The video coding system 40 may also include the optional processor 43. The optional processor 43 may similarly include application-specific integrated circuit (ASIC) logic, a graphics processing unit, a general-purpose processor, or the like. In addition, the memory 44 may be a memory of any type, for example, a volatile memory (for example, a static random access memory (SRAM) or a dynamic random access memory (DRAM)) or a nonvolatile memory (for example, a flash memory). In a non-limitative example, the memory 44 may be implemented by a cache memory. In other examples, the processing circuit 46 may include a memory (for example, a cache) for implementing an image buffer.

In some examples, the video encoder 20 implemented by using the logic circuit may include an image buffer (which is implemented by, for example, the processing circuit 46 or the memory 44) and a graphics processing unit (which is implemented by, for example, the processing circuit 46). The graphics processing unit may be communicatively coupled to the image buffer. The graphics processing unit may include a video encoder 20 implemented by using the processing circuit 46, to implement various modules described with reference to FIG. 2 and/or any other encoder system or subsystem described in this specification. The logic circuit may be configured to perform various operations described in this specification.

In some examples, the video decoder 30 may be implemented by the processing circuit 46 in a similar manner, to implement various modules that are described with reference to the decoder 30 in FIG. 3 and/or any other decoder system or subsystem described in this specification. In some examples, the video decoder 30 implemented by using the logic circuit may include an image buffer (which is implemented by the processing circuit 46 or the memory 44) and a graphics processing unit (which is implemented by, for example, the processing circuit 46). The graphics processing unit may be communicatively coupled to the image buffer. The graphics processing unit may include a video decoder 30 implemented by using the processing circuit 46, to implement various modules described with reference to FIG. 3 and/or any other decoder system or subsystem described in this specification.

In some examples, the antenna 42 may be configured to receive an encoded bitstream of video data. As described, the encoded bitstream may include data, an indicator, an index value, mode selection data, or the like related to video frame encoding described in this specification, for example, data related to coding partitioning (for example, a transform coefficient or a quantized transform coefficient, an optional indicator (as described), and/or data defining the coding partitioning). The video coding system 40 may further include the video decoder 30 that is coupled to the antenna 42 and that is configured to decode the encoded bitstream. The display device 45 is configured to present a video frame.

It should be understood that in embodiments of this application, for the example described with reference to the video encoder 20, the video decoder 30 may be configured to perform a reverse process. With regard to a signaling syntax element, the video decoder 30 may be configured to receive and parse such a syntax element and correspondingly decode related video data. In some examples, the video encoder 20 may entropy encode the syntax element into an encoded video bitstream. In such examples, the video decoder 30 may parse such syntax element and decode the associated video data accordingly.

For convenience of description, embodiments of the present invention are described herein, for example, by reference to High-Efficiency Video Coding (HEVC) or to the reference software of Versatile Video Coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the present invention are not limited to HEVC or VVC.

Figure 2:
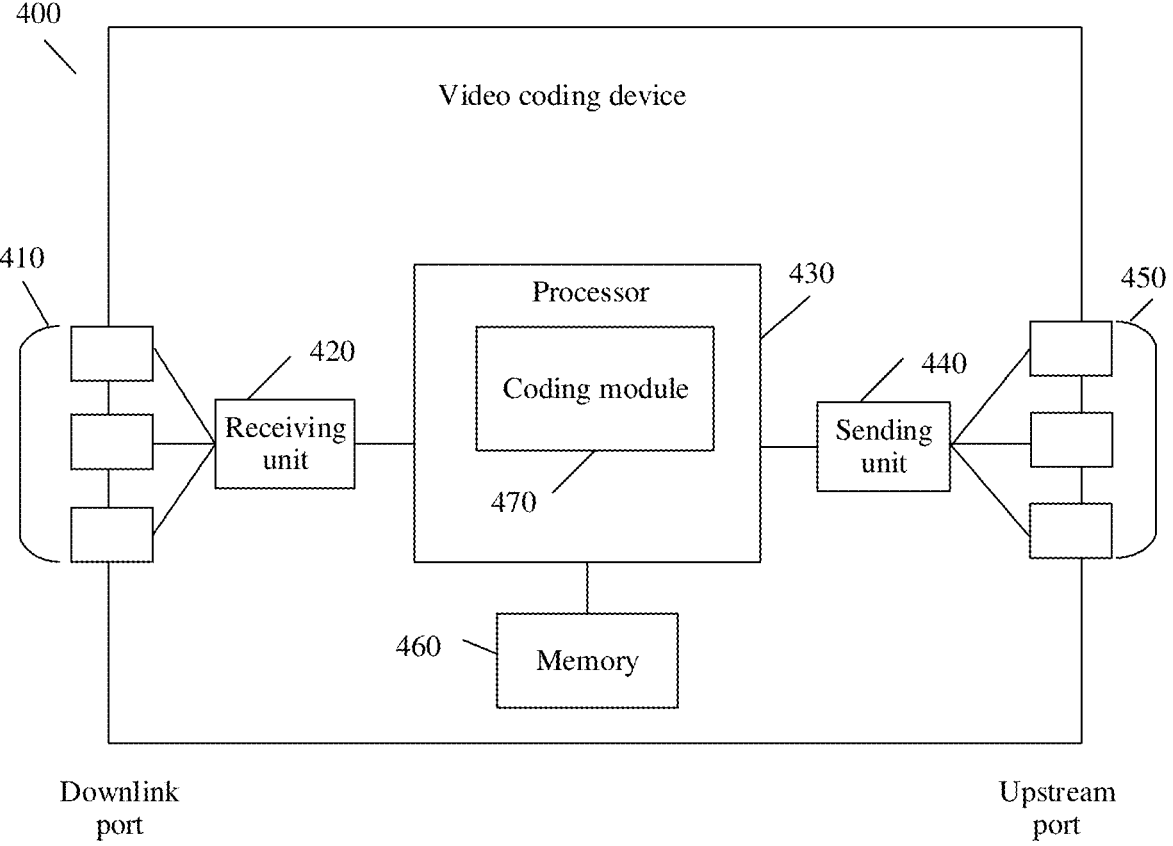
FIG. 2 is a schematic diagram of an example video coding device 400 according to an embodiment of the disclosure.

FIG. 2 is a schematic diagram of an example video coding device 400 according to an embodiment of the disclosure. The video coding device 400 is suitable for implementing the disclosed embodiments as described herein. In an embodiment, the video coding device 400 may be a decoder such as the video decoder 30 of FIG. 1A or an encoder such as the video encoder 20 of FIG. 1A.

The video coding device 400 includes ingress ports 410 (or input ports 410) and receiving units (receiver unit, Rx) 420 for receiving data; a processor, a logic unit, or a central processing unit (CPU) 430 for processing the data, for example, the processor 430 may be a neural network processing unit 430; transmitter units (Tx) 440 and egress ports 450 (or output ports 450) for transmitting the data; and a memory 460 for storing the data. The video coding device 400 may also include optical-to-electrical (OE) components and electrical-to-optical (EO) components coupled to the ingress ports 410, the receiving units 420, the transmitter units 440, and the egress ports 450 for egress or ingress of optical or electrical signals.

The processor 430 is implemented by hardware and software. The processor 430 may be implemented as one or more CPU chips, cores (for example, a multi-core processor), FPGAs, ASICs, and DSPs. The processor 430 is in communication with the ingress ports 410, receiving units 420, transmitter units 440, egress ports 450, and memory 460. The processor 430 includes a coding module 470 (for example, a neural network NN-based coding module 470). The coding module 470 implements the disclosed embodiments described above. For instance, the coding module 470 implements, processes, prepares, or provides the various encoding operations. Therefore, inclusion of the encoding/decoding module 470 provides a substantial improvement to functions of the video coding device 400 and affects a switching of the video coding device 400 to a different state. Alternatively, the coding module 470 is implemented as instructions stored in the memory 460 and executed by the processor 430.

The memory 460 may include one or more disks, tape drives, and solid-state drives and may be used as an overflow data storage device, to store programs when such programs are selected for execution, and to store instructions and data that are read during program execution. The memory 460 may be volatile and/or non-volatile, and may be a read-only memory (ROM), a random access memory (RAM), a ternary content addressable memory (TCAM), and/or a static random access memory (SRAM).

Figure 3:
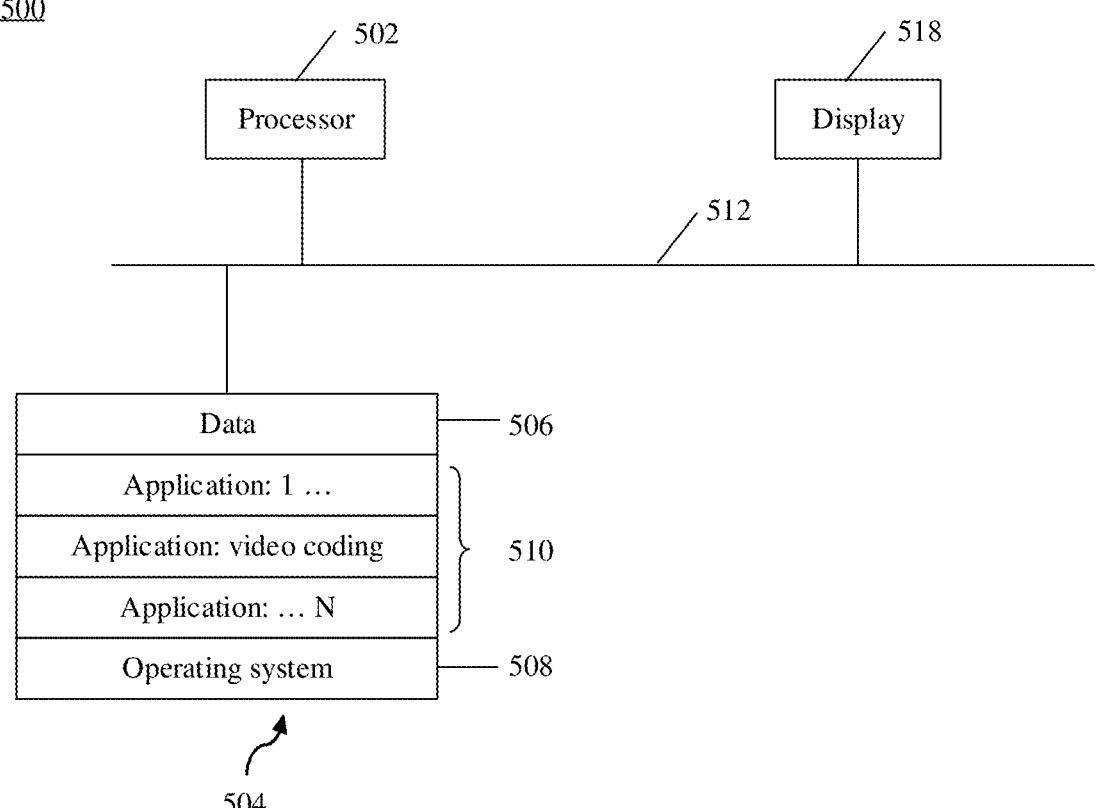
FIG. 3 is a simplified block diagram of an example apparatus 500 according to an embodiment.

FIG. 3 is a simplified block diagram of an example apparatus 500 that may be used as either or both of the source device 12 and the destination device 14 in FIG. 1A according to an embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable class of storage device can be used as the memory 504. The memory 504 can include code and data 506 that is accessed by the processor 502 using a bus 512. The memory 504 may further include an operating system 508 and an application program 510, the application program 510 including at least one program that permits the processor 502 to perform the methods described in the specification. For example, the application program 510 may include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, a secondary storage may be directly coupled to the other components of the apparatus 500 or may be accessed via a network and may include a single integrated unit such as a memory card or multiple units such as multiple memory cards. The apparatus 500 can thus be implemented in a wide variety of configurations.

Figure 4:
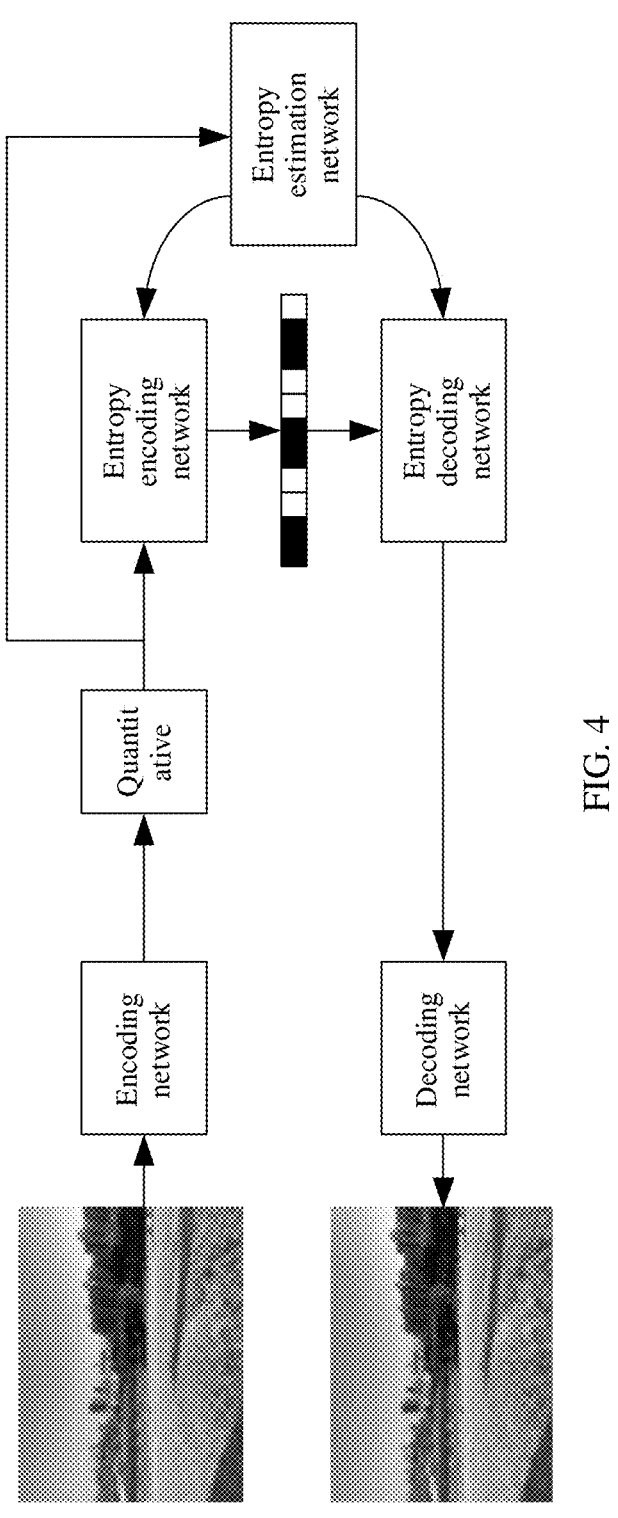
FIG. 4 is a schematic diagram of an example end-to-end deep learning image encoding and decoding framework.

FIG. 4 is a schematic diagram of an example end-to-end deep learning image encoding and decoding framework. As shown in FIG. 4, the image encoding and decoding framework includes an encoder side: an encoding network (encoder), a quantization module, and an entropy encoding network; and a decoder side: an entropy decoding network, a decoding network (decoder), and an entropy estimation network.

At the encoder side, an original image is transformed from the image domain to the feature domain after being processed by the encoding network. A transformed image feature is encoded into a to-be-transmitted or to-be-stored bitstream after being processed by the quantization module and the entropy encoding network. At the decoder side, a bitstream is decoded into an image feature after being processed by the entropy decoding network. The image feature is transformed from the feature domain to the image domain after being processed by the decoding network, to obtain a reconstructed image. The entropy estimation network estimates and obtains an estimated probability value of each feature element based on the image feature, and the probability value is used for processing of the entropy encoding network and the entropy decoding network.

In this embodiment, both the encoding network (Encoder) and the decoding network (Decoder) have a non-linear transformation unit.

Figure 5:
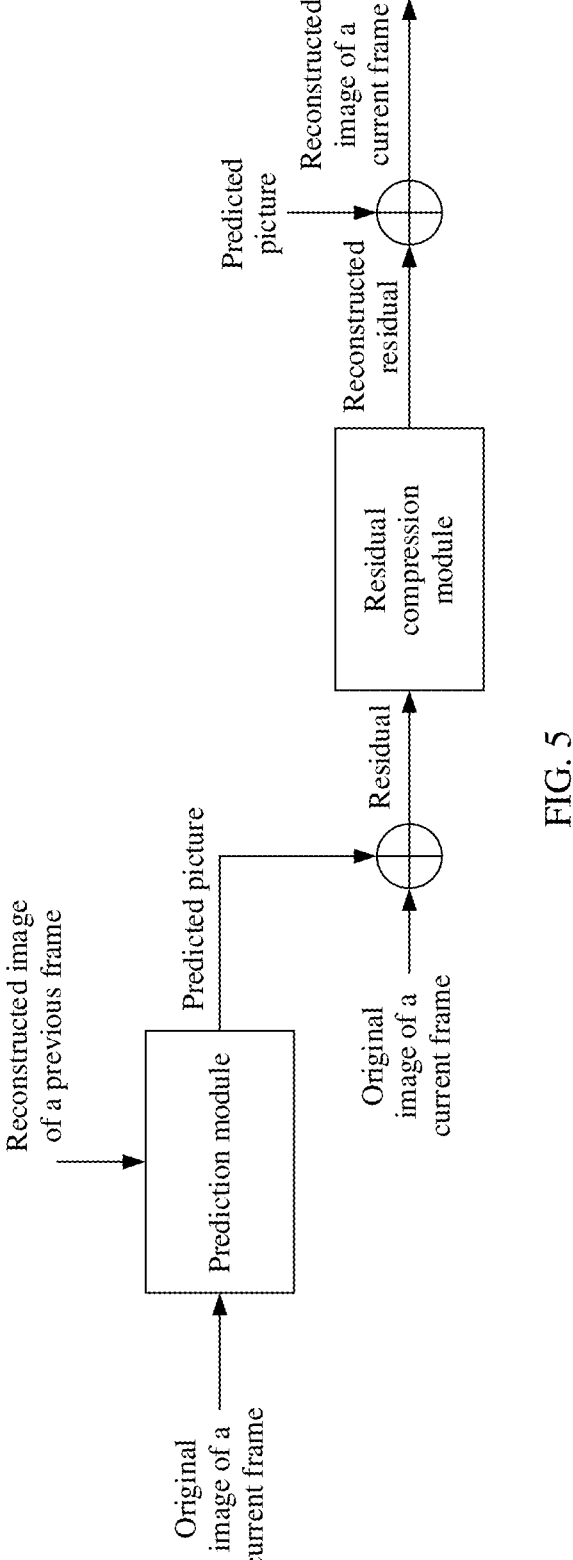
FIG. 5 is a schematic diagram of an example end-to-end deep learning video encoding and decoding framework.

FIG. 5 is a schematic diagram of an example end-to-end deep learning video encoding and decoding framework. As shown in FIG. 5, the video encoding and decoding framework includes a prediction module (predict model) and a residual compression (residual compress) module.

The prediction module predicts a current frame by using the reconstructed image of a previous frame to obtain a predicted image. On one hand, the residual compression module compresses a residual between an original image and a predicted image of the current frame. On the other hand, the residual compression module decompresses the residual to obtain a reconstructed residual, and sums up the reconstructed residual and the predicted image to obtain a reconstructed image of the current frame. Both an encoding sub-network and a decoding sub-network in the prediction module and the residual compression module have a non-linear transformation unit.

In this embodiment, both the prediction module (predict model) and the residual compression (residual compress) module have the non-linear transformation unit.

Figure 6:
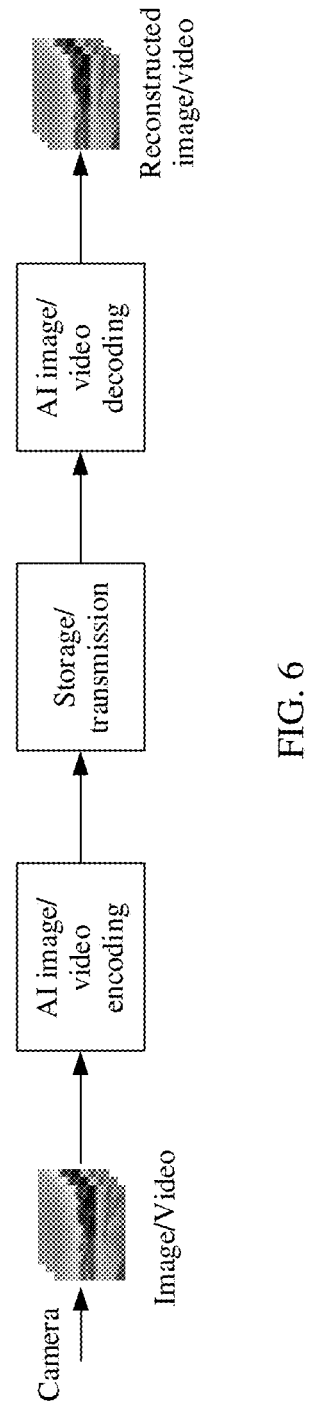
FIG. 6 is a schematic diagram of an example application scenario according to an embodiment of this application.

FIG. 6 is a schematic diagram of an example application scenario according to an embodiment of this application. As shown in FIG. 6, the application scenario may be a service related to image/video capturing, storage, or transmission in a terminal, a cloud server, or video surveillance, for example, photographing/video recording by a terminal, an album, a cloud album, or video surveillance.

Encoder side: A camera captures an image/video. An artificial intelligence (AI) image/video encoding network obtains an image feature with low redundancy from feature extraction for an image/video, and then performs compression based on the image feature to obtain a bitstream/image file.

Decoder side: When the image/video needs to be output, an AI image/video decoding network decompresses the bitstream/image file to obtain an image feature, and then performs reverse feature extraction on the image feature to obtain a reconstructed image/video.

A storage/transmission module stores (for example, photographing by a terminal, video surveillance, or a cloud server) or transmits (for example, a cloud service or a live broadcast technology) the bitstream/image file obtained by compression for different services.

Figure 7:
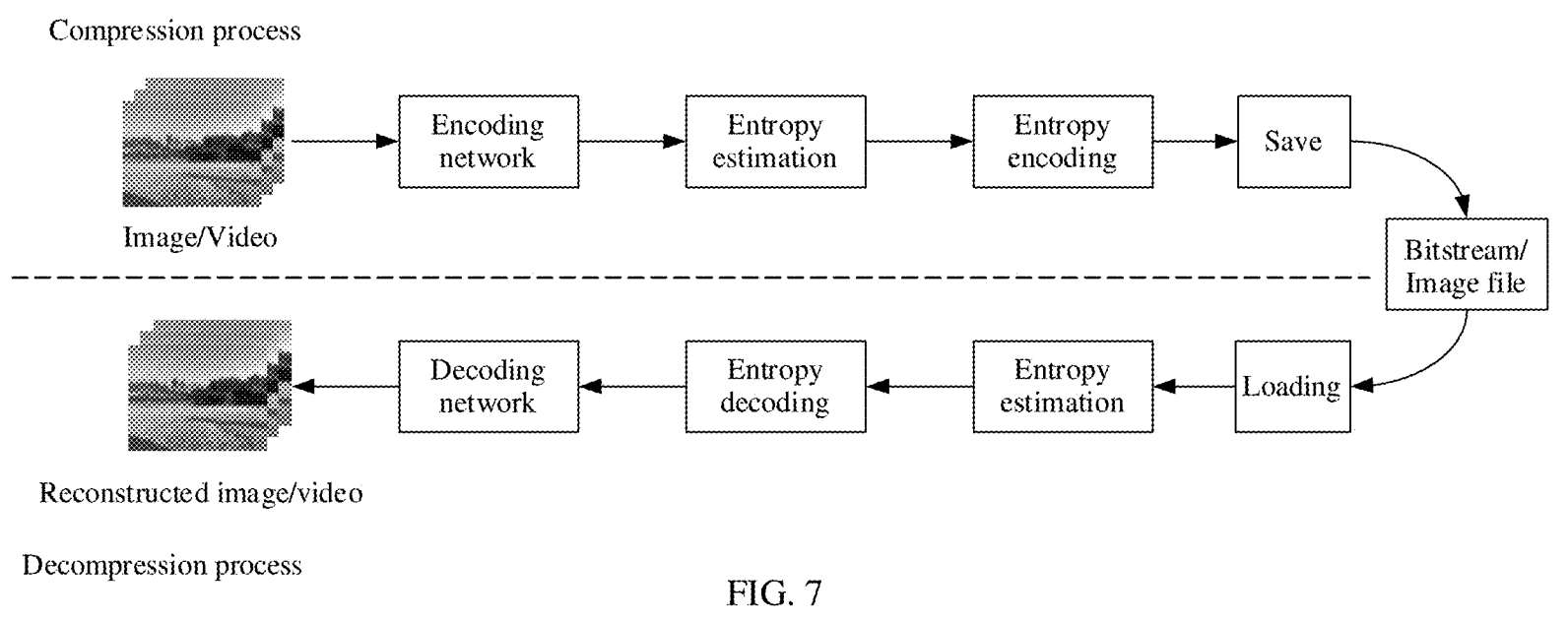

FIG. 7 is a schematic diagram of an example application scenario according to an embodiment of this application. As shown in FIG. 7, the application scenario may be a service related to image/video capturing, storage, or transmission in a terminal or video surveillance, for example, a terminal album, video surveillance, or live broadcast.

Encoder side: An encoding network converts an image/video into an image feature with a lower redundancy degree. The encoding network usually includes a non-linear transformation unit and has a non-linear feature. An entropy estimation network is responsible for calculating an encoding probability of each piece of data in the image feature. An entropy encoding network performs lossless coding on the image feature based on a probability corresponding to each piece of data to obtain a bitstream/image file. This further reduces the amount of data transmission in an image compression process.

Decoder side: An entropy decoding network performs lossless decoding on the bitstream/image file based on the probability corresponding to each piece of data to obtain a reconstructed image feature. A decoding network performs inverse transformation on the image feature output by the entropy decoding network, and parses the image feature into an image/video. Corresponding to the encoding network, the decoding network usually includes a non-linear transformation unit and has a non-linear feature. A storage module saves the bitstream/image file in a corresponding storage location of the terminal. A loading module loads the bitstream/image file from the corresponding storage location of the terminal, and inputs the bitstream/image file to the entropy decoding network.

FIG. 8 is a schematic diagram of an example application scenario according to an embodiment of this application. As shown in FIG. 8, the application scenario may be a service related to image/video capturing, storage, or transmission in cloud or video surveillance, for example, cloud album, video surveillance, or live broadcast.

Encoder side: The local end obtains an image/video, encodes the image/video (JPEG) to obtain a compressed image/video, and then sends a compressed image/video to the cloud. The cloud performs JPEG decoding on the compressed image/video to obtain the image/video, and then compresses the image/video to obtain a bitstream/image file and stores the bitstream/image file.

Decoder side: When the image/video needs to be locally obtained from the cloud, the cloud decompresses the bitstream/image file to obtain the image/video, performs JPEG encoding on the image/video to obtain a compressed image/video, and sends the compressed image/video to the local end. The local end performs JPEG decoding on the compressed image/video to obtain the image/video. For a structure of the cloud and a usage of each module, refer to the structure and the usage of each module in FIG. 7. Details are not described herein in embodiments of this application.

Based on the foregoing encoding/decoding network and application scenario, an embodiment of this application provides an image encoding/decoding method, to implement efficient non-linear transformation processing and improve rate-distortion performance of an image/video compression algorithm.

Figures 9, 10A:
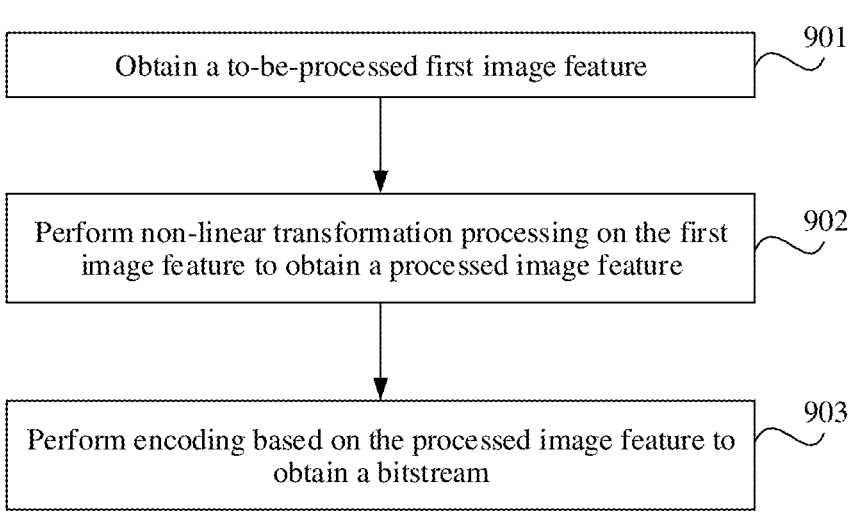
FIG. 9 is a flowchart of a process 900 of an example image encoding method according to an embodiment of this application.
FIG. 10*a* is a schematic diagram of a structure of an example non-linear transformation unit having a local attention mechanism.

FIG. 9 is a flowchart of an example process 900 of an image encoding method according to an embodiment of this application. The process 900 may be performed by the encoder side in the foregoing embodiment. The process 900 is described as a series of steps or operations. It should be understood that the steps or operations of the process 900 may be performed in various sequences and/or simultaneously, and are not limited to an execution sequence shown in FIG. 9. The process 900 includes the following steps.

Step 901: Obtain a to-be-processed first image feature.

The first image feature is obtained after an encoder side obtains the to-be-processed image and converts the to-be-processed image from an image domain to a feature domain. The conversion herein may include: 1. convolution processing, where a convolutional layer is used to extract a feature, and convolution processing has a local receptive field and a weight sharing mechanism (that is, each filter processes an input feature in sequence); 2. extracting features by using an MLP or a fully connected layer, where the extracting features by using an MLP or a fully connected layer has a global receptive field feature, and a weight is not shared; and 3. transformer (transformer) processing, including matrix multiplication, MLP, and normalization processing, where transformer processing has a global receptive field feature, and has a strong long-distance capture dependency capability.

The first image feature may be represented in a form of a two-dimensional matrix (Lx C, where L represents a length, and C represents a channel (channel)) or a three-dimensional matrix (C×H×W, where C represents a quantity of channels, H represents a height, and W represents a width). A specific form is associated with the foregoing conversion manner. For example, the first image feature extracted through the convolution processing or by using the MLP generally corresponds to the three-dimensional matrix, and the first image feature obtained through processing by using the transformer generally corresponds to the two-dimensional matrix.

For example, the first image feature is represented as a two-dimensional matrix:

$$A = \begin{bmatrix} a_{0,2} & a_{1,2} & a_{2,2} \\ a_{0,1} & a_{1,1} & a_{2,1} \\ a_{0,0} & a_{1,0} & a_{2,0} \end{bmatrix}$$

A two-dimensional matrix A is a 3×3 matrix and includes nine elements. Each element a(i, j) corresponds to one feature value in the first image feature. i represents a length corresponding to the element a(i, j), and j represents a channel in which the element a(i, j) is located.

For another example, the first image feature is represented as a three-dimensional matrix:

$$B = \begin{bmatrix} \begin{bmatrix} b_{0,2,0} & b_{1,2,0} & b_{2,2,0} \\ b_{0,1,0} & b_{1,1,0} & a_{2,1,0} \\ b_{0,0,0} & b_{1,0,0} & a_{2,0,0} \end{bmatrix}, \begin{bmatrix} b_{0,2,1} & b_{1,2,1} & b_{2,2,1} \\ b_{0,1,1} & b_{1,1,1} & b_{2,1,1} \\ b_{0,0,1} & b_{1,0,1} & b_{2,0,1} \end{bmatrix} \end{bmatrix}$$

A three-dimensional matrix B is a 3×3×2 matrix and includes 18 elements. Each element a(i, j, 1) corresponds to a feature value in the first image feature. i represents a row in which the element a(i, j, 1) is located, j indicates a column in which the element a(i, j, 1) is located, and 1 indicates a channel in which the element a(i, j, 1) is located.

It should be noted that a manner of obtaining the first image feature is not specifically limited in embodiments of this application.

The to-be-processed image may be a picture, or may be a frame of image in a video, or may be an image block obtained by segmenting the foregoing picture or image. This is not specifically limited.

Step 902: Perform non-linear transformation processing on the first image feature to obtain a processed image feature.

In a possible implementation, the first non-linear operation is performed on each feature value in the first image feature to obtain a second image feature. The convolution processing is performed on the second image feature to obtain a third image feature, where a plurality of feature values in the third image feature correspond to a plurality of feature values in the first image feature. The element-wise multiplication operation is performed on the plurality of corresponding feature values in the first image feature and the third image feature to obtain the processed image feature.

FIG. 10a is a schematic diagram of a structure of an example non-linear transformation unit having an attention mechanism. As shown in FIG. 10a, in embodiments of this application, the non-linear transformation unit is used to implement the foregoing non-linear transformation processing, and includes a first non-linear operation, convolution processing, and an element-wise multiplication operation.

The first non-linear operation is an operation performed on each feature value in the first image feature, and may include an absolute value operation, an ReLU series, Sigmoid, Tanh, a PWL operation, and the like.

The absolute value operation is to obtain an absolute value of the input feature value. This may be expressed by using the following formula:

$$y = |x| = \begin{cases} x, & x \geq 0 \\ -x, & x < 0 \end{cases}$$

The piecewise linear mapping includes a rectified linear unit (ReLU), a leakage rectified linear unit (LeakyReLU), or a PWL operation. The ReLU is a piecewise linear mapping method. For the input feature value, a feature value less than 0 is output as 0, and a feature value greater than or equal to 0 remains the same. This may be expressed by using the following formula:

$$y = Relu(x) = \begin{cases} x, & x \geq 0 \\ 0, & x < 0 \end{cases}$$

The LeakyReLU is a piecewise linear mapping method. Based on the ReLU, an input feature value less than 0 is scaled by using a preset weight, and the weight is usually 0.01. This may be expressed by using the following formula:

$$y = \text{LeakyReLU}(x) = \begin{cases} x, & x \geq 0 \\ ax, & x < 0 \end{cases}$$

a represents a preset value, and is usually set to 0.01. Sigmoid may be represented as the following operation:

$$y = \text{Sigmoid}(x) = \frac{1}{1 + e^{-x}}$$

Tanh may be represented as the following operation:

$$y = \tanh(x) = \frac{e^x - e^{-x}}{e^x + e^{-x}}$$

PWL may be represented as the following operation:

$$PWL_N(x, B_L, B_R, Y_P, K_L, K_R) = \begin{cases} (x - B_L) * K_L + Y_P^0, & x < B_L \\ (x - B_R) * K_R + Y_P^N, & x \geq B_R \\ (x - B_{idx}) * K_{idx} + Y_P^{idx}, & B_L \leq x < B_R \end{cases} \quad (1)$$

N represents a quantity of segments; $B_L$ represents a left boundary; $B_R$ represents a right boundary; $Y_P$ represents y-axis coordinate values corresponding to N+1 boundary points; $K_L$ represents a leftmost slope; $K_R$ represents a rightmost slope; idx represents an index number of a segment to which x belongs; $B_{idx}$ and $K_{idx}$ are a corresponding left boundary and a slope of the segment; and $$d = \frac{B_R - B_L}{N}$$

represents a segment length. The values are calculated as follows:

$$idx = \left\lfloor \frac{x - B_L}{d} \right\rfloor \quad (2)$$

$$B_{idx} = B_L + idx * d \quad (3)$$

$$K_{idx} = \frac{Y_P^{idx+1} - Y_P^{idx}}{d} \quad (4)$$

It should be noted that the formula (1) may be used at different granularities (by layer or even by channel). When the formula is used based on a channel, $B_L$, $B_R$, $Y_P$, $K_L$, $K_R$ are channel-by-channel parameters. Optionally, a same hyperparameter N may be used in all PWL operations.

The PWL has the following advantages: As a general approximator, the PWL can approximate any continuous bounded scalar function. The PWL continuously changes with a parameter (other than the hyperparameter N), which is very helpful to optimization based on a gradient. Flexibility is concentrated in a bounded area, so that a learnable parameter can be used to the maximum extent. PWL calculation efficiency is high due to even segmentation, especially in reasoning.

Figure 11:
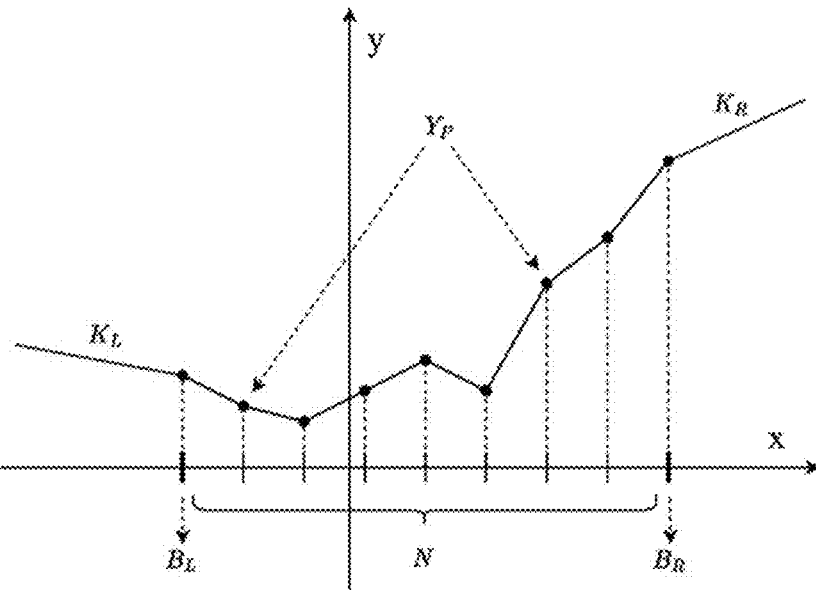
FIG. 11 is a schematic diagram of an example piecewise linear (PWL) function.

FIG. 11 is a schematic diagram of an example PWL function. As shown in FIG. 11, a quantity N of segments is a hyperparameter, and affects a fitting capability of the PWL function. A larger quantity of segments indicates a higher degree of freedom, and a larger model capacity. The left and right boundaries $B_L$ and $B_R$ define a main effective area that PWL focuses on. [$B_L$, $B_R$] is evenly divided into the N segments, to obtain the N+1 boundary points. Each boundary point has a corresponding y-axis coordinate value $Y_P$, and the coordinates determine a shape of a PWL curve. For an area outside [$B_L$, $B_R$], a shape of the area outside a boundary can be controlled by using two slopes $K_L$ and $K_R$.

It should be noted that the piecewise linear mapping may alternatively use another variant manner of the ReLU, or may use another new first non-linear operation manner. This is not specifically limited in embodiments of this application.

After the first non-linear operation, the first image feature is transformed into the second image feature. The second image feature may be represented in a form of a matrix as the first image feature. Because the first non-linear operation is performed for each feature value in the first image feature, each feature value in the first image feature corresponds to one feature value in the second image feature value. Therefore, a matrix corresponding to the second image feature and a matrix corresponding to the first image feature have a same size, and feature values (values of matrix elements) at a same location correspond to each other. For example, if the first image feature is represented as a 3×3 matrix as the matrix A, the second image feature may also be represented as a 3×3 matrix. However, because the first non-linear operation is performed on the first image feature and the second image feature, feature values in the first image feature and the second image feature are not completely the same. Correspondingly, element values in matrices respectively corresponding to the first image feature and the second image feature are not completely the same.

Convolution processing is performed on the second image feature, to output a third image feature. The third image feature may be considered as a local response (that is, a refined value) of the second image feature. In other words, the third image feature is a response signal obtained by performing the convolution processing on the second image feature. Because a receptive field of the convolution processing is limited, a response value of each location in an image feature output after the convolution processing is related only to an input feature value of a location adjacent to the location. This is referred to as a local response. The convolution processing may be expressed as the following formula:

$$conv1(x) = \beta + \sum \gamma \times x$$

$\gamma$ represents a weight of a convolutional layer, and $\beta$ represents an offset parameter of the convolutional layer.

Figure 12:
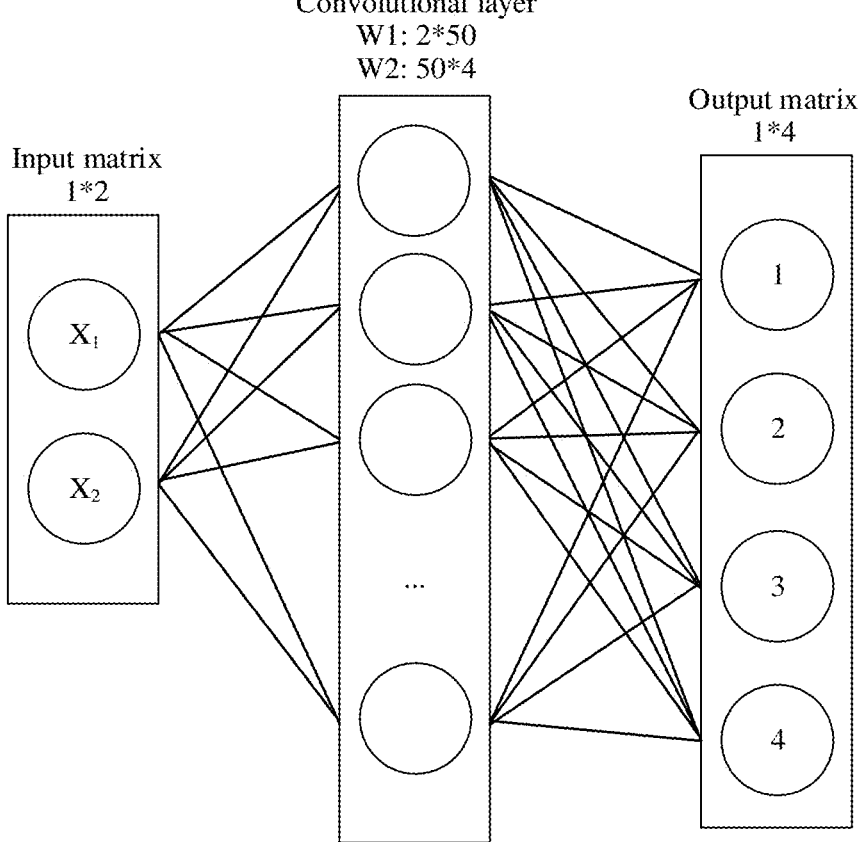
FIG. 12 is a schematic diagram of example convolution processing.

After the convolution processing is performed, a size of a matrix corresponding to the third image feature is also the same as a size of the matrix corresponding to the first image feature. FIG. 12 is a schematic diagram of convolution processing. As shown in FIG. 12, a 1*2 matrix is input, and a 1*4 matrix is output after processing of a convolutional layer. The convolutional layer includes two filters: one is a 2*50 matrix W1, and the other is a 50*4 matrix W2. First, a convolution operation is performed on an input matrix by using the matrix W1, to obtain a 1*50 matrix, and then a convolution operation is performed on the matrix by using the matrix W2, to obtain a 1*4 output matrix.

The performing an element-wise multiplication operation on a plurality of corresponding feature values in a first image feature and a third image feature is performing element-wise multiplication on initial input of a non-linear transformation unit and output of convolution processing. This may be represented by the following formula:

$$c(i, j) = a(i, j) \times b(i, j)$$

(i, j) represents an index of a feature value in an image feature in which the feature value is located. a(i, j) represents a feature value in the first image feature, b(i, j) represents a feature value in a second image feature, and c(i, j) represents a feature value in a processed image feature.

It can be learned that a matrix corresponding to the processed image feature and a matrix corresponding to the first image feature also have the same size.

It should be noted that, in embodiments of this application, that a plurality of feature values in two graphic features correspond to each other may mean that after the two image features are respectively represented as matrices, values of elements at a same location in the two matrices have an operation relationship, and the two image features correspond to each other. For example, both the first image feature and the third image feature are represented in a form of the foregoing matrix A, and elements at a same location $a_{0,2}$ correspond to each other.

In addition, the third image feature whose special size is different from that of the first image may be obtained after the convolution processing. This depends on an internal structure of the convolution processing, especially a length, a width, and a quantity of channels of a filter during the convolution processing. If the third image feature and the first image feature have different sizes, correspondingly elements in the matrix corresponding to the third image feature are not in a one-to-one correspondence with elements in the matrix corresponding to the first image feature. In this case, it may be considered that a plurality of elements in the matrix corresponding to the first image feature are multiplied by a same element in the matrix corresponding to the third image feature. For example, if a quantity of channels of the matrix corresponding to the first image feature is 3, and a quantity of channels of the matrix corresponding to the third image feature is 1, an element in the matrix corresponding to the third image feature may be separately multiplied by an element at a same location in each channel in the matrix corresponding to the first image feature. This is not specifically limited in embodiments of this application.

The first non-linear operation, the convolution processing, and the element-wise multiplication operation may be represented by the following formula (1):

$$y_i = x_i \times \left(\beta_i + \sum_j \gamma_{ij} \emptyset(x_j)\right) \quad (1)$$

x represents an input feature value. y represents an output feature value. $\emptyset(x_j)$ represents the first non-linear operation. $\gamma$ represents a weight of the convolutional layer. $\beta$ represents a bias parameter of the convolutional layer.

Because a multiplication operation is used in the foregoing formula, compared with a division operation of $$y_i = \frac{x_i}{\sqrt{\beta_i + \sum_j \gamma_{ij} x_j^2}}$$

in convolution processing of a related technology (GDN division normalization), to consider a limitation that a square root need to be a positive number, convolution parameters $\gamma$ and $\beta$ need to be positive numbers. In addition, there is no need to impose a limitation that the denominator cannot be 0 to consider division, and values of the convolution parameters $\gamma$ and $\beta$ are also limited.

A local attention mechanism is implemented after the foregoing first non-linear operation, convolution processing, and element-wise multiplication operation. Local means that the first non-linear operation is performed element-wise, and an output value is obtained for each input feature value based only on a feature of an input feature value, without considering impact of a surrounding feature value. The attention mechanism means that some of all feature values in the first image feature are important, and some are redundant. An output of the convolution processing may be a weight of each feature value in the image feature. An original feature value may be refined, an important feature value is highlighted, and a redundant feature value is suppressed. In the element-wise multiplication operation, the value of each feature value in the first image feature is refined by using the foregoing local information, thereby avoiding limitation on the convolution parameter.

In a possible implementation, the first non-linear operation is performed on each feature value in the first image feature to obtain a second image feature. The convolution processing is performed on the second image feature to obtain a third image feature, where a plurality of feature values in the third image feature correspond to a plurality of feature values in the first image feature. The element-wise multiplication operation is performed on the plurality of corresponding feature values in the first image feature and the third image feature to obtain a fourth image feature, where the plurality of feature values in the fourth image feature correspond to the plurality of feature values in the first image feature. The element-wise addition operation is performed on the plurality of corresponding feature values in the first image feature and the fourth image feature to obtain the processed image feature.

Figure 10B:
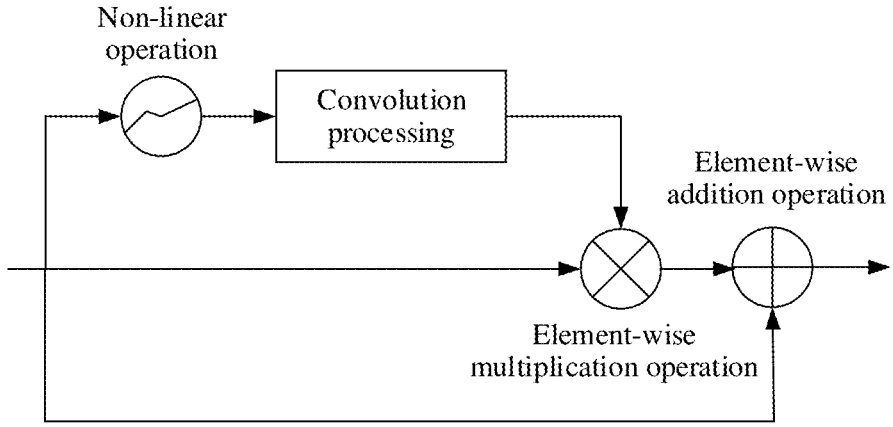
FIG. 10*b* is a schematic diagram of a structure of an example residual non-linear transformation unit having a local attention mechanism.

FIG. 10b is a schematic diagram of a structure of an example residual non-linear transformation unit having an attention mechanism. As shown in FIG. 10b, in embodiments of this application, the non-linear transformation unit is used to implement the foregoing non-linear transformation processing, and includes a first non-linear operation, convolution processing, an element-wise multiplication operation, and an element-wise addition operation.

In embodiments of this application, for the first non-linear operation, the convolution processing, and the element-wise multiplication operation, refer to the descriptions in the foregoing implementation.

After a fourth image feature is obtained, the element-wise addition operation is performed on a plurality of corresponding feature values in a first image feature and the fourth image feature. In other words, element-wise addition is performed on initial input of the non-linear transformation unit and output of the element-wise multiplication operation. This may be represented by the following formula:

$$\text{sum}(i,\ j) = a(i,\ j) + c(i,\ j)$$

(i, j) represents an index of a feature value in an image feature in which the feature value is located. a(i, j) represents a feature value in the first image feature. c(i, j) represents a feature value in the fourth image feature. sum(i, j) represents a feature value in a processed image feature.

The element-wise addition operation is a residual structure in which a head and a tail are added, so that an encoding and decoding network that uses the foregoing processing process can converge easily during training.

The first non-linear operation, the convolution processing, the element-wise multiplication operation, and the element-wise addition operation may be represented by the following formula (2):

$$y_i = x_i \times \left(\beta_i + \sum_j \gamma_{ij} \emptyset(x_j)\right) + x_i \qquad (2)$$

x represents an input feature value. y represents an output feature value. $\emptyset(x_j)$ represents the first non-linear operation. $\gamma$ represents a weight of the convolutional layer. $\beta$ represents a bias parameter of the convolutional layer.

After the foregoing formula (2) is transformed, $$y_i = x_i \times \left(\beta_i + 1 + \sum_j \gamma_{ij} \emptyset(x_j)\right)$$

may be obtained. Convolution processing may be obtained by comparing with the formula (1), and may be expressed as the following formula:

$$conv2(x) = \beta + 1 + \sum \gamma \times x$$

It can be learned that convolution processing conv1(x) is similar to convolution processing conv2(x). A difference lies in that an extra 1 is added to a convolution parameter in the convolution processing conv2(x). In this way, the foregoing two implementations may be changed by fine-tuning a convolution parameter $\beta$ in convolution in the convolution processing. To be specific, if a non-linear transformation unit does not include an element-wise addition operation, the convolution processing conv1(x) may be used. If a non-linear transformation unit includes an element-wise addition operation, the convolution processing conv2(x) may be used.

In a possible implementation, based on the foregoing first implementation, a second non-linear operation may be further performed on the third image feature, and then an element-wise multiplication operation is performed on an output processed third image feature and the first image feature. Alternatively, based on the foregoing second implementation, a second non-linear operation may be performed on the third image feature, and then an element-wise multiplication operation is performed on an output processed third image feature and the first image feature. In other words, the second non-linear operation is added to the non-linear transformation processing. Input of the second non-linear operation is output of convolution processing in the non-linear transformation processing. Output of the second non-linear operation is used as input of the element-wise multiplication operation.

Figure 10C:
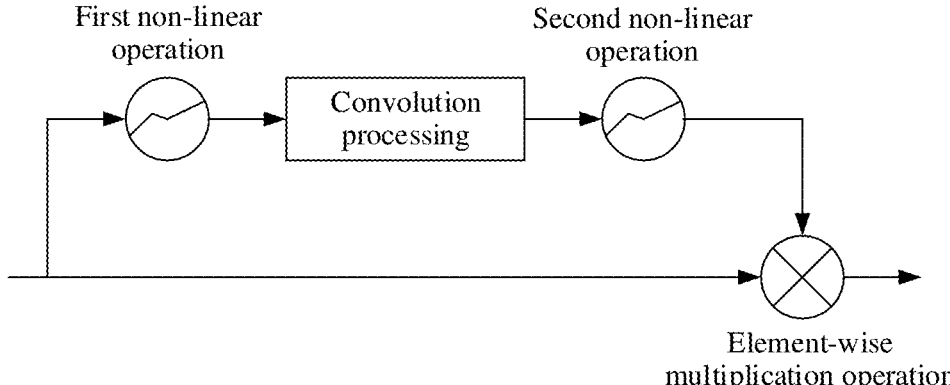
FIG. 10*c* is a schematic diagram of a structure of an example residual non-linear transformation unit having an attention mechanism.

FIG. 10c is a schematic diagram of a structure of an example residual non-linear transformation unit having an attention mechanism. As shown in FIG. 10c, in embodiments of this application, the non-linear transformation unit is used to implement the foregoing non-linear transformation processing, and includes a first non-linear operation, convolution processing, a second non-linear operation, and an element-wise multiplication operation.

For the first non-linear operation, the convolution processing, and the element-wise multiplication operation, refer to the descriptions of the embodiment shown in FIG. 10a. The second non-linear operation and the first non-linear operation may use a same operation method, or may use different operation methods. The second non-linear operation may include absolute value operation, ReLU, LeakyReLU, and the like. This is not specifically limited in embodiments of this application.

The first non-linear operation, the convolution processing, the second non-linear operation, and the element-wise multiplication operation may be represented by the following formula (3):

$$y_i = x_i * \emptyset_2 \left(\beta_i + \sum_j \gamma_{ij} \emptyset_1(x_j)\right) \qquad (3)$$

x represents an input feature value. y represents an output feature value. $\emptyset_1(x_j)$ represents the first non-linear operation. $\emptyset_2(x_1)$ represents the second non-linear operation. $\gamma$ represents a weight of the convolutional layer. $\beta$ represents a bias parameter of the convolutional layer.

Figure 10D:
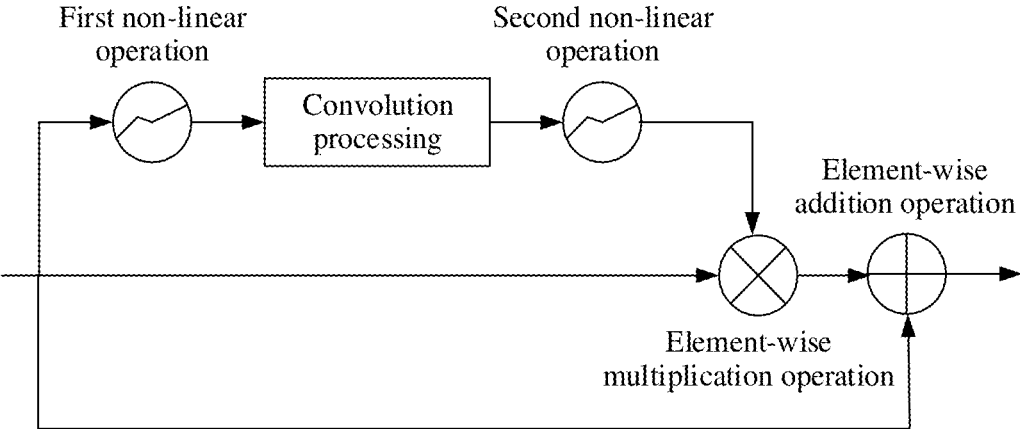
FIG. 10*d* is a schematic diagram of a structure of an example non-linear transformation unit having an attention mechanism.

FIG. 10d is a schematic diagram of a structure of an example non-linear transformation unit having an attention mechanism. As shown in FIG. 10d, in embodiments of this application, the non-linear transformation unit is used to implement the foregoing non-linear transformation processing, and includes a first non-linear operation, convolution processing, a second non-linear operation, an element-wise multiplication operation, and an element-wise addition operation.

For the first non-linear operation, the convolution processing, the element-wise multiplication operation, and the element-wise addition operation, refer to the descriptions of the embodiment shown in FIG. 10b. The second non-linear operation and the first non-linear operation may use a same operation method, or may use different operation methods. The second non-linear operation may include absolute value operation, ReLU, LeakyReLU, and the like. This is not specifically limited in embodiments of this application.

When the second non-linear operation is implemented by using piecewise linear mapping, piecewise linear mapping may use different segment quantities. A mapping slope on each segment may be determined through training or may be directly specified. Different piecewise linear functions may be used for each channel of an input feature image, or a same piecewise linear function may be used for all channels, or a same piecewise linear function may be used for processing several channels. In this implementation, after model training is completed, a residual structure is no longer merged with convolution, but may be merged with the piecewise linear function. To be specific, output of an original piece-wise linear function is increased by 1 to form a new piecewise linear function.

The first non-linear operation, the convolution processing, the second non-linear operation, the element-wise multipli-cation operation, and the element-wise addition operation may be represented by the following formula (4):

$$y_i = x_i * \emptyset_2\left(\beta_i + \sum_j \gamma_{ij}\emptyset_1(x_j)\right) + x_i \qquad (4)$$

x represents an input feature value. y represents an output feature value. $\emptyset_1(x_j)$ represents the first non-linear opera-tion. $\emptyset_2(x_1)$ represents the second non-linear operation. y represents a weight of the convolutional layer. β represents a bias parameter of the convolutional layer.

Step 903: Perform encoding based on the processed image feature to obtain a bitstream.

After the processed image feature is obtained, an encoder side may continue to perform the convolution processing on the processed image feature, or may perform, after the convolution processing, the non-linear transformation pro-cessing on output of the convolution processing again, and then perform entropy encoding on a result of the foregoing processing to obtain a bitstream. The entropy encoding may be implemented by using the entropy encoding network in the embodiments shown in FIG. 4 to FIG. 8. Alternatively, the result of the foregoing processing may be encoded in another encoding manner to obtain the bitstream. This is not limited in this application.

Figure 13:
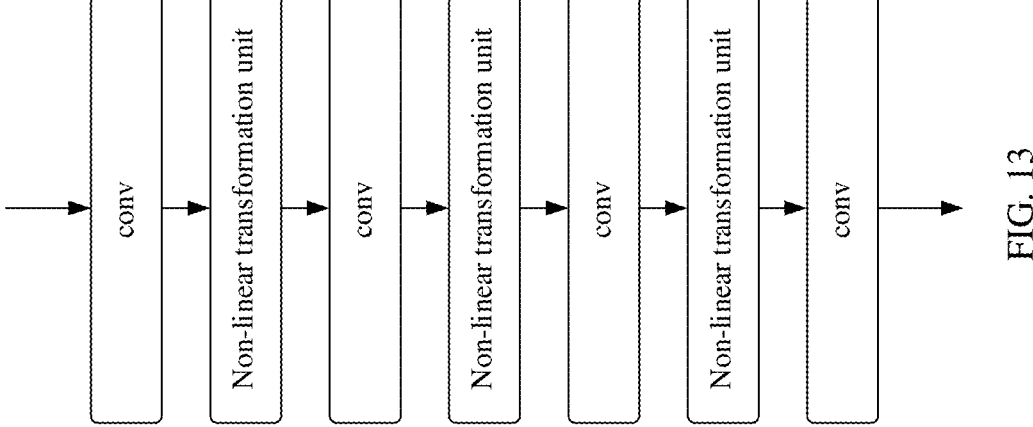
FIG. 13 is a schematic diagram of a structure of an example encoding network.

FIG. 13 is a schematic diagram of a structure of an example encoding network. As shown in FIG. 13, the encoding network includes four convolutional layers (conv) and three non-linear transformation units. The convolutional layer and the non-linear transformation units are arranged in a cross manner. To be specific, convolution processing, non-linear transformation processing, convolution process-ing, non-linear transformation processing, convolution pro-cessing, non-linear transformation processing, and convo-lution processing are sequentially performed on an input image to obtain an output image feature. The non-linear transformation unit may use a structure of the embodiment shown in FIG. 10a or FIG. 10b. Then, entropy encoding is performed on the output image feature.

In embodiments of this application, non-linear transfor-mation processing in a decoding network is changed, so that an output value is obtained for each input feature value based only on a feature of the input feature value, without considering impact of a surrounding feature value. In addi-tion, an original feature value is refined, an important feature value is highlighted, and a redundant feature value is sup-pressed. In addition, the value of each feature value in the first image feature may be further refined, thereby avoiding limitation on the convolutional parameter, implementing efficient non-linear transformation processing in the encod-ing network, and further improving rate-distortion perfor-mance of an image/video compression algorithm.

Figure 14:
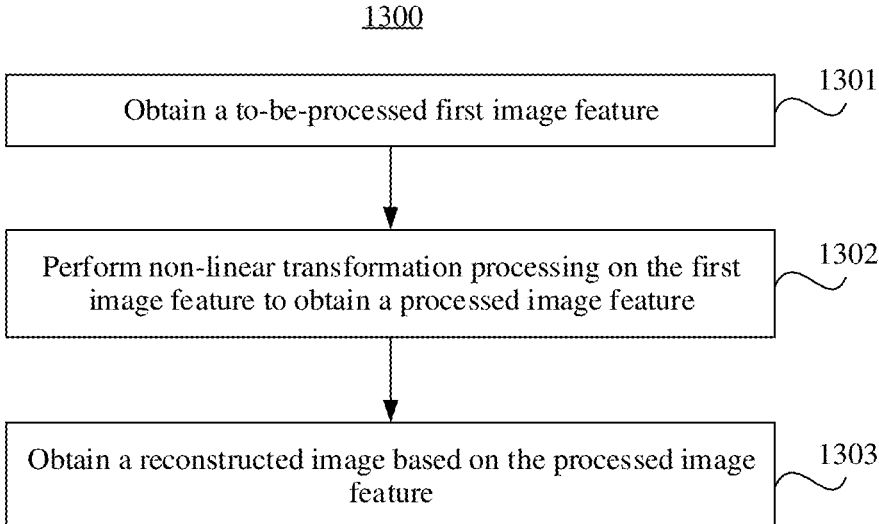
FIG. 14 is a flowchart of a process 1300 of an example image decoding method according to an embodiment of this application.

FIG. 14 is a flowchart of a process 1300 of an example image decoding method according to an embodiment of this application. The process 1300 may be performed by the decoder side in the foregoing embodiment. The process 1300 is described as a series of steps or operations. It should be understood that steps or operations of the process 1300 may be performed in various sequences and/or simultane-ously, not limited to an execution sequence shown in FIG. 14. The process 1300 includes the following steps.

Step 1301: Obtain a to-be-processed first image feature.

A decoder side corresponds to an encoder side. The first image feature may be obtained after the decoder side per-forms entropy decoding on a bitstream. The entropy decod-ing may be implemented by using an entropy decoding network in the embodiments shown in FIG. 4 to FIG. 8. Then, convolution processing, deconvolution processing, transpose convolution processing, interpolation+convolu-tion processing, transformer processing, or the like is per-formed. It should be understood that, after the foregoing processing, a size of the output first image feature is restored (which is mirror-symmetric to the encoder side), a size of an input image feature may change, a quantity of channels may change, or the like. This is not specifically limited. The foregoing processing is opposite to the conversion manner in step 901 in the embodiment shown in FIG. 9.

Similarly, the first image feature may also be represented in a form of a two-dimensional matrix or a three-dimen-sional matrix. For a principle, refer to the description in step 901.

Step 1302: Perform non-linear transformation processing on the first image feature to obtain a processed image feature.

In a possible implementation, the first non-linear opera-tion is performed on each feature value in the first image feature to obtain a second image feature. The convolution processing is performed on the second image feature to obtain a third image feature, where a plurality of feature values in the third image feature correspond to a plurality of feature values in the first image feature. The element-wise multiplication operation is performed on the plurality of corresponding feature values in the first image feature and the third image feature to obtain the processed image feature.

For this embodiment, refer to the embodiment shown in FIG. 10a.

In a possible implementation, the first non-linear opera-tion is performed on each feature value in the first image feature to obtain a second image feature. The convolution processing is performed on the second image feature to obtain a third image feature, where a plurality of feature values in the third image feature correspond to a plurality of feature values in the first image feature. The element-wise multiplication operation is performed on the plurality of corresponding feature values in the first image feature and the third image feature to obtain a fourth image feature, where the plurality of feature values in the fourth image feature correspond to the plurality of feature values in the first image feature. The element-wise addition operation is performed on the plurality of corresponding feature values in the first image feature and the fourth image feature to obtain the processed image feature.

For this embodiment, refer to the embodiment shown in FIG. 10b.

Step 1303: Obtain a reconstructed image based on the processed image feature.

After the processed image feature is obtained, a decoder side may also continue to perform the convolution process-ing on the processed image feature, or may perform the non-linear transformation processing on output of the con-volution processing again after the convolution processing, to transform the processed image feature from a feature domain to an image domain, to obtain the reconstructed image.

Figure 15:
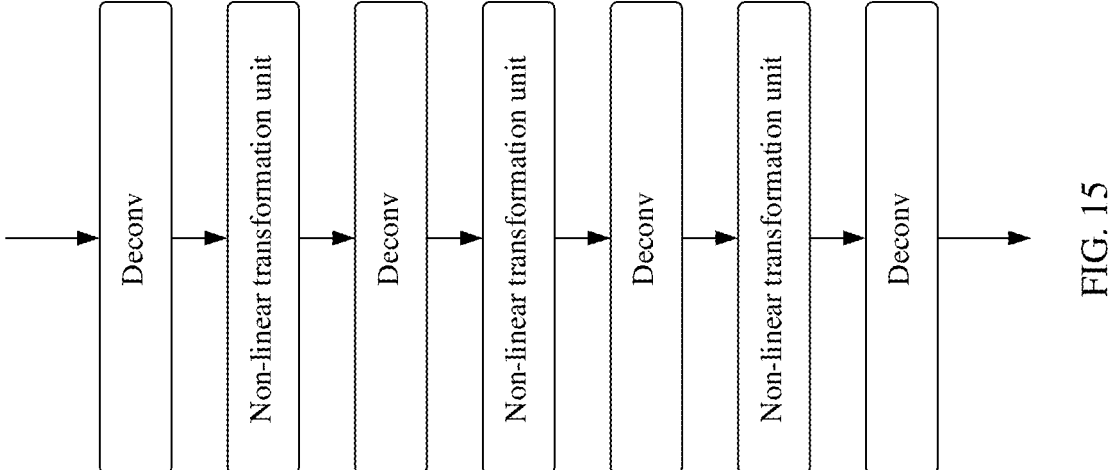
FIG. 15 is a schematic diagram of a structure of an example decoding network.

FIG. 15 is a schematic diagram of a structure of an example decoding network. As shown in FIG. 15, the decoding network includes four deconvolutional layers (Deconv) and three non-linear transformation units. The deconvolutional layers and the non-linear transformation units are arranged in a cross manner. To be specific, deconvolution processing, non-linear transformation processing, deconvolution processing, non-linear transformation processing, deconvolution processing, non-linear transformation processing, and deconvolution processing are sequentially performed on the input image to obtain the reconstructed image. The non-linear transformation unit may use a structure of the embodiment shown in FIG. 10a or FIG. 10b. Then, entropy decoding is performed on the output image feature.

In embodiments of this application, non-linear transformation processing in a decoding network is changed, so that an output value is obtained for each input feature value based only on a feature of the input feature value, without considering impact of a surrounding feature value. In addition, an original feature value is refined, an important feature value is highlighted, and a redundant feature value is suppressed. In addition, the value of each feature value in the first image feature may be further refined, thereby avoiding limitation on the convolutional parameter, implementing efficient non-linear transformation processing in the encoding network, and further improving rate-distortion performance of an image/video compression algorithm.

It should be noted that an embodiment of this application further provides a training manner of an encoding/decoding network, which may include: first constructing an end-to-end encoding/decoding network, including an encoder encoder, a decoder decoder, and an entropy estimation unit. During training, the encoding and decoding network is considered as a whole, and training data (images or videos) is input to the encoder to obtain feature data. On one hand, the feature data calculates encoding bit rate overheads by using the entropy estimation unit to obtain a bit rate loss. On the other hand, the feature data outputs reconstructed data by using the decoder side, and a distortion degree is calculated for the reconstructed data and the input data, to obtain a distortion loss. Aback propagation algorithm updates learnable parameters in a model based on a weighted loss formed by the bit rate loss and the distortion loss. After the training is complete, parameters of all submodules in the model are fixed.

Thereafter, an encoder (encoder) and an entropy estimation unit are divided to an encoder side, and are configured to encode data to be encoded into a bitstream file. A decoder and an entropy estimation unit are divided to a decoder side, and are configured to reconstruct data from the bitstream file.

The following describes the foregoing image encoding method by using several specific embodiments. A non-linear transformation unit provided in embodiments of this application is referred to as an ResAU below.

Embodiment 1

Figure 16A:
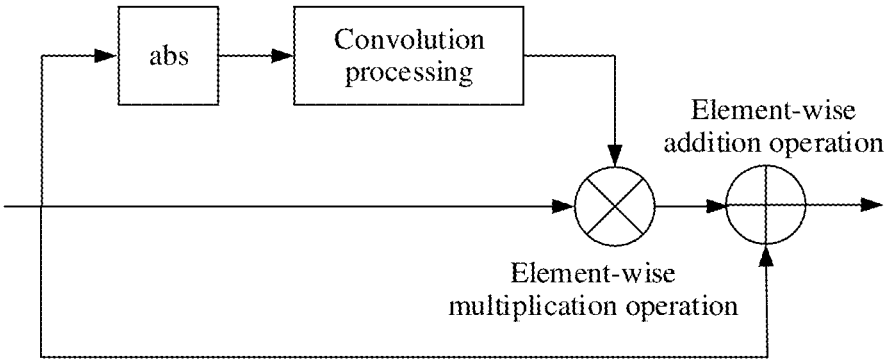
FIG. 16*a* is an example schematic diagram of a structure of an example non-linear transformation unit (ResAU)

FIG. 16a is an example schematic diagram of a structure of an example non-linear transformation unit (ResAU). As shown in FIG. 16a, the ResAU uses the structure shown in FIG. 10b, and includes a first non-linear operation, convolution processing, an element-wise multiplication operation, and an element-wise addition operation. An absolute value operation (abs) is used for the first non-linear operation. The ResAU may be used in the encoding network shown in FIG. 13 or the decoding network shown in FIG. 15.

Based on formula (2), the ResAU in this embodiment may be represented by the following formula:

$$y_i = x_i * \left(\beta_i + \sum_j \gamma_{ij} |x_j|\right) + x_i$$

A compression performance test is performed on the ResAU shown in FIG. 16a.

Test set: A Kodak test set includes 24 portable network graphics (PNG) images with a resolution of 768×512 or 512×768.

Experiment: The ResAU shown in FIG. 16a is used in an encoding/decoding network structure with hybrid Gaussian super prior entropy estimation.

Figure 17A:
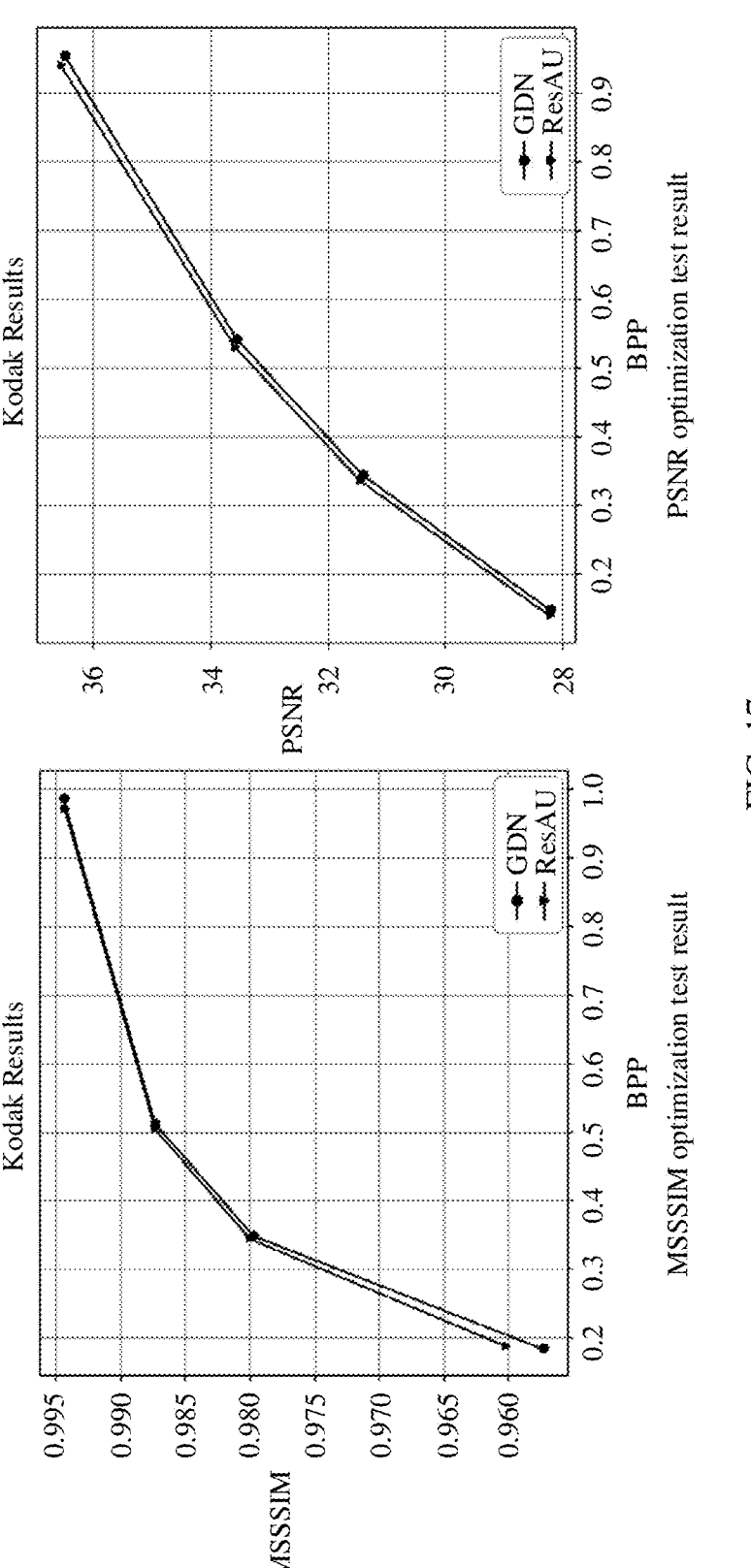
FIG. 17*a* shows overall performance of an example ResAU on 24 images in a Kodak test set.

Performance corresponding to the experiment: FIG. 17a shows overall performance of an ResAU on 24 images in a Kodak test set. Compared with a currently mainstream GDN non-linear unit, an RD performance of a GMM network using the ResAU is better on the basis of a same computational complexity. More specifically, when a same decoding reconstruction quality is achieved, using the ResAU in a GMM encoding/decoding network may save about 12% encoding bit rate overheads compared with using an ReLU, and may save about 5% encoding bit rate overheads compared with using GDN.

Performance analysis: In the ResAU provided in embodiments of this application, it is a feasible solution to introduce a non-linear feature by using an absolute value operation. Based on a basic GMM structure, the ResAU can achieve better rate-distortion performance than the GDN.

Embodiment 2

Figure 16B:
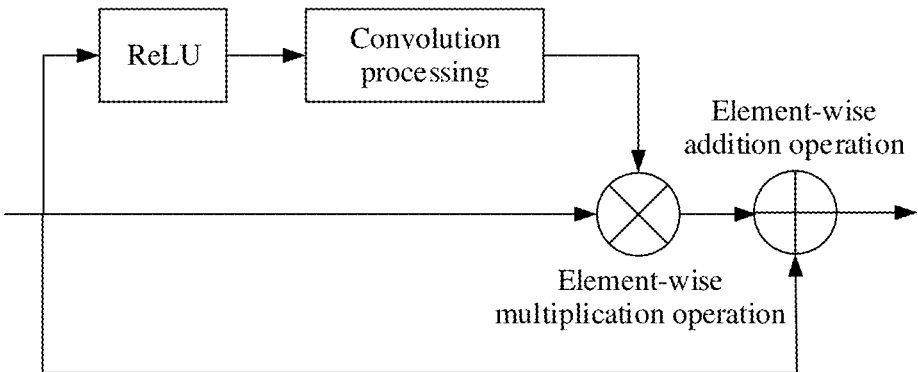
FIG. 16*b* is an example schematic diagram of a structure of an example ResAU.

FIG. 16b is an example schematic diagram of a structure of an example ResAU. As shown in FIG. 16b, the ResAU uses the structure shown in FIG. 10b, and includes a first non-linear operation, convolution processing, an element-wise multiplication operation, and an element-wise addition operation. A ReLU operation is used for the first non-linear operation. The ResAU may be used in the encoding network shown in FIG. 13 or the decoding network shown in FIG. 15.

Based on formula (2), the ResAU in this embodiment may be represented by the following formula:

$$y_i = x_i * \left(\beta_i + \sum_j \gamma_{ij} \phi(x_j)\right) + x_i$$

A compression performance test is performed on the ResAU shown in FIG. 16b.

Test set: 24 Kodak test images.

Experiment: The ResAU shown in FIG. 16b is used in an encoding/decoding network structure with hybrid Gaussian super prior entropy estimation. In this experiment, the non-linear operation in the ResAU is replaced with an ReLU and a LeakyReLU respectively. A comparison experiment includes an identity solution without the non-linear operation and an ResAU solution with an absolute value operation described in Embodiment 1.

Figure 17B:
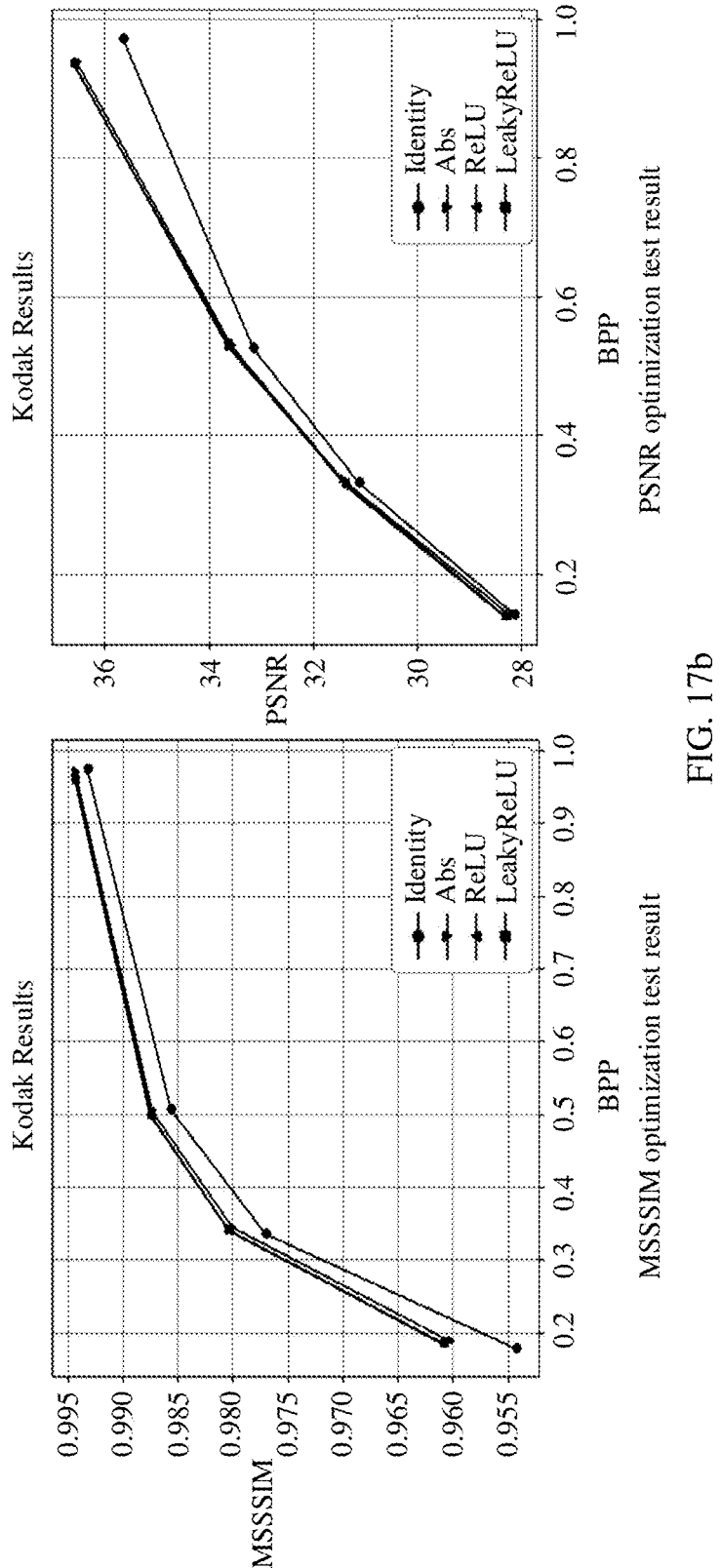
FIG. 17*b* shows overall performance of an example ResAU on 24 images in a Kodak test set.

Performance corresponding to the experiment: FIG. 17b shows overall performance of an ResAU on 24 images in a Kodak test set. It can be learned from an RD curve that, compared with the identity solution that does not use the non-linear operation, using the element-wise non-linear operation can greatly improve rate-distortion performance of an image compression network. The effect of the non-linear operation of an ReLU class is slightly better than that of the non-linear operation of the absolute value operation.

Embodiment 3

Figure 16C:
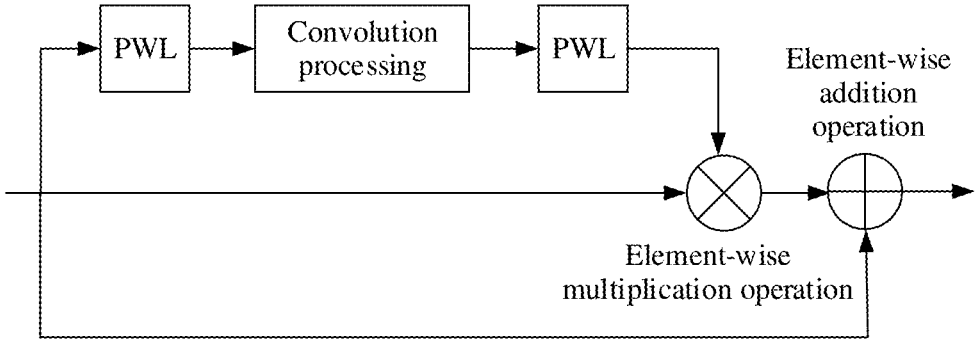
FIG. 16*c* is an example schematic diagram of a structure of an example ResAU.

FIG. 16*c* is an example schematic diagram of a structure of an example ResAU. As shown in FIG. 16*c*, the ResAU uses the structure shown in FIG. 10*d*, and includes a first non-linear operation, convolution processing, a second non-linear operation, an element-wise multiplication operation, and an element-wise addition operation. Both the first non-linear operation and the second non-linear operation are PWL operations. The ResAU may be used in the encoding network shown in FIG. 13 or the decoding network shown in FIG. 15.

The ResAU introduces a non-linear feature by using a piecewise linear PWL function, implements a local attention mechanism by using convolution, the piecewise linear PWL function, and the element-wise multiplication operation, and uses local information to correct a response on each channel at each location in a feature map. The element-wise multiplication operation may avoid a problem of limited space of a learnable parameter value in GDN. In addition, a residual connection in which a head and a tail are added may make it easy for a network to converge during training.

Based on the formula (4), the ResAU in this embodiment may be represented by the following formula:

$$y_i = x_i * \varnothing_2\Big(\beta_i + \sum_j \gamma_{ij} \varnothing_1(x_j)\Big) + x_i$$

Both $\varnothing_1(\cdot)$ and $\varnothing_2(\cdot)$ are PWL functions, $\gamma$ is a weight of the convolutional layer, $\beta$ is an offset parameter of the convolutional layer, and both the parameters are learnable parameters whose value ranges are not limited.

Functions of operations included in this structure are as follows:

First PWL operation: The function is a piecewise linear function, and may provide a non-linear feature for overall transformation. Under effect of this operation, each value of input data is calculated based on a numerical interval in which the value is located and a different mapping relationship, to obtain an output value. For an input feature, feature maps of different channel dimensions may be calculated by using a same piecewise linear mapping function or different piecewise linear mapping functions. The parameter of the PWL function may be a preset value, or may be obtained through training and learning.

Convolution processing: In the ResAU, input of convolution processing is output of the non-linear operation. A tensor with a fixed size is obtained by performing convolution processing on an input tensor, and an output tensor may be considered as a local response to the input tensor.

Second PWL operation: The function is a piecewise linear function, which can scale and map output of convolution and provide a non-linear feature for overall transformation. Under effect of this operation, each value of input data is calculated based on a numerical interval in which the value is located and a different mapping relationship, to obtain an output value. For an input feature, feature maps of different channel dimensions may be calculated by using a same piecewise linear mapping function or different piecewise linear mapping functions. The parameter of the PWL function may be a preset value, or may be obtained through training and learning.

Element-wise multiplication operation: In the ResAU, input of the element-wise multiplication operation is original input of the unit and output of convolution processing. Sizes of two input tensors are the same, and a multiplication operation is performed on data at a corresponding location. A size of an output tensor is also the same as a size of an input tensor. Convolution processing and the element-wise multiplication operation are combined to implement a local attention mechanism, and local information of an input feature is used to correct a response of each location in a feature map. In addition, the element-wise multiplication operation avoids a problem of limited space of a learnable parameter value of a mainstream non-linear unit in the GDN in a current image video compression network.

Element-wise addition operation: In the ResAU, input of the element-wise addition operation is original input of the unit and output of the element-wise multiplication operation. The operation is a residual structure in which a head and a tail are added, so that an encoding and decoding network that uses the non-linear unit can converge easily during training.

A residual attention non-linear unit that uses the piecewise linear PWL function described in this embodiment may be used in an end-to-end image compression network and a video compression network that are based on a deep neural network. More specifically, the residual attention non-linear unit is generally used in an encoding module (encoder) and a decoding module (decoder) in the end-to-end image compression network, and is used in an encoding module and a decoding module of a prediction sub-network and a residual compression sub-network of the end-to-end video compression network.

An experiment is performed on a common end-to-end encoding and decoding network based on a super priori structure. In this embodiment, when a preset value of the first PWL operation is a Leaky ReLU function, a quantity of segments of the second PWL operation is 6, and a channel dimension grouping granularity is 1 (that is, features of all channels use different piecewise linear functions to calculate output values), compression ratio distortion performance can be improved by 0.506% in comparison with that in a solution in which Tanh is used to implement a non-linear operation after a convolution operation. In this embodiment, when the preset value of the first PWL operation is the Leaky ReLU function, the quantity of segments of the second PWL operation is 6, and the channel dimension grouping granularity is 8 (that is, features are grouped by using every eight channels as a unit, and all channels in a same group use a same piecewise linear function to calculate the output values), the compression ratio distortion performance is reduced by 0.488% in comparison with that in the solution in which Tanh is used to implement the non-linear operation after the convolution operation. In this embodiment, when the preset value of the first PWL operation is the Leaky ReLU function, the quantity of segments of the second PWL operation is 6, and the channel dimension is not grouped (that is, the same piecewise linear function is used to calculate the output values for features of all the channels), the compression ratio distortion performance is reduced by 0.659% in comparison with that in the solution in which Tanh is used to implement the non-linear operation after the convolution operation.

Figure 16D:
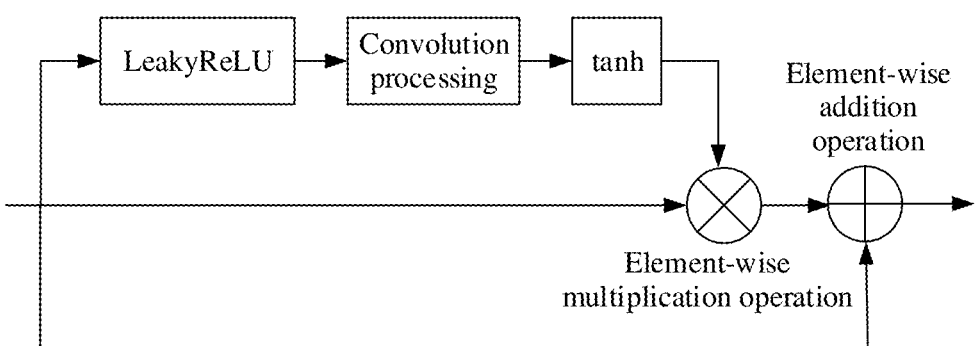
FIG. 16*d* is an example schematic diagram of a structure of an example ResAU.

Optionally, FIG. 16*d* is an example schematic diagram of a structure of an ResAU. As shown in FIG. 16*d*, the ResAU uses the structure shown in FIG. 10*d*, and includes a first non-linear operation, convolution processing, a second non-linear operation, an element-wise multiplication operation, and an element-wise addition operation. The first non-linear operation is a Leaky ReLU, and the second non-linear operation is Tanh. Convolution processing may be conv1×1, and conv1×1 indicates that a size of a convolution kernel (or a convolution operator) is 1×1. The ResAU may be used in the encoding network shown in FIG. 13 or the decoding network shown in FIG. 15.

Embodiment 4

Figure 16E:
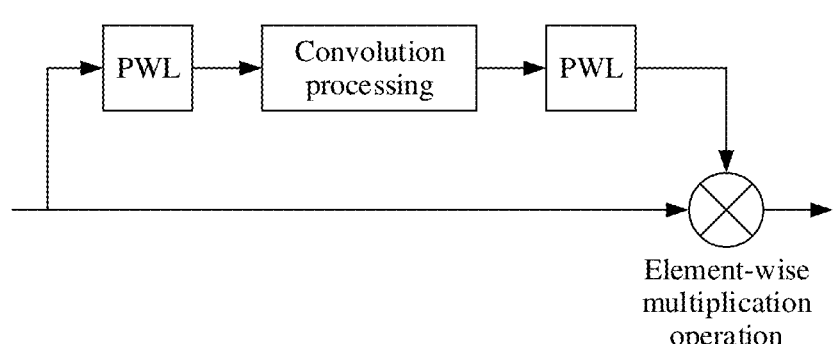
FIG. 16*e* is an example schematic diagram of a structure of an example ResAU.

FIG. 16e is an example schematic diagram of a structure of an example ResAU. As shown in FIG. 16e, the ResAU uses the structure shown in FIG. 10c, including a first non-linear operation, convolution processing, a second non-linear operation, and an element-wise multiplication operation. Both the first non-linear operation and the second non-linear operation are PWL operations. The ResAU may be used in the encoding network shown in FIG. 13 or the decoding network shown in FIG. 15.

Based on the formula (3), the ResAU in this embodiment may be represented by the following formula:

$$y_i = x_i * \emptyset_2 \left( \beta_i + \sum_j \gamma_{ij} \emptyset_1(x_j) \right)$$

Both $\emptyset_1(\cdot)$ and $\emptyset_2(\cdot)$ are PWL functions, y is a weight of the convolutional layer, $\beta$ is an offset parameter of the convolutional layer, and both the parameters are learnable parameters whose value ranges are not limited.

Functions of operations included in this structure are as follows:

First PWL operation: The function is a piecewise linear function, and may provide a non-linear feature for overall transformation. Under effect of this operation, each value of input data is calculated based on a numerical interval in which the value is located and a different mapping relationship, to obtain an output value. For an input feature, feature maps of different channel dimensions may be calculated by using a same piecewise linear mapping function or different piecewise linear mapping functions. The parameter of the PWL function may be a preset value, or may be obtained through training and learning.

Convolution processing: In the ResAU, input of convolution processing is output of the non-linear operation. A tensor with a fixed size is obtained by performing convolution processing on an input tensor, and an output tensor may be considered as a local response to the input tensor.

Second PWL operation: The function is a piecewise linear function, which can scale and map output of convolution and provide a non-linear feature for overall transformation. Under effect of this operation, each value of input data is calculated based on a numerical interval in which the value is located and a different mapping relationship, to obtain an output value. For an input feature, feature maps of different channel dimensions may be calculated by using a same piecewise linear mapping function or different piecewise linear mapping functions. The parameter of the PWL function may be a preset value, or may be obtained through training and learning.

Element-wise multiplication operation: In the ResAU, input of the element-wise multiplication operation is original input of the unit and output of convolution processing. Sizes of two input tensors are the same, and a multiplication operation is performed on data at a corresponding location. A size of an output tensor is also the same as a size of an input tensor. Convolution processing and the element-wise multiplication operation are combined to implement a local attention mechanism, and local information of an input feature is used to correct a response of each location in a feature map. In addition, the element-wise multiplication operation avoids a problem of limited space of a learnable parameter value of a mainstream non-linear unit in the GDN in a current image video compression network.

An attention non-linear unit that uses a residual-free structure and that uses the piecewise linear function described in this embodiment may be used in an end-to-end image compression network and a video compression network that are based on a deep neural network. More specifically, the attention non-linear unit is generally used in an encoding module encoder and a decoding module decoder in the end-to-end image compression network, and is used in an encoding module and a decoding module of a prediction sub-network and a residual compression sub-network of the end-to-end video compression network. In addition, the attention non-linear unit that uses a residual-free structure and that uses the piecewise linear function described in this embodiment may be obtained through conversion by using a residual attention non-linear unit that uses the piecewise linear function. After training is completed, the second PWL operation and the element-wise addition operation in the residual attention non-linear unit that uses the piecewise linear function may be combined (that is, entire output of the second PWL operation is added by 1, to form a new PWL function, and the element-wise addition operation is removed), to obtain a corresponding attention non-linear unit that uses the residual-free structure and that uses the piecewise linear function.

An experiment is performed on a common end-to-end encoding and decoding network based on a super priori structure. After training is completed, the residual attention non-linear unit in the experiment corresponding to Embodiment 4 is converted into the non-linear unit that uses the residual-free structure described in this embodiment, so that an encoding and decoding effect the same as that in the solution corresponding to Embodiment 4 can be obtained.

In this embodiment, when a preset value of the first PWL operation is a Leaky ReLU function, a quantity of segments of the second PWL operation is 6, and a channel dimension grouping granularity is 1 (that is, features of all channels use different piecewise linear functions to calculate output values), compression ratio distortion performance can be improved by 0.506% in comparison with that a solution in which Tanh is used to implement a non-linear operation after a convolution operation. In addition, the solution in this embodiment can reduce calculation time consumption and power consumption in the element-wise addition operation.

In this embodiment, when the preset value of the first PWL operation is the Leaky ReLU function, the quantity of segments of the second PWL operation is 6, and the channel dimension grouping granularity is 8 (that is, features are grouped by using every eight channels as a unit, and all channels in a same group use a same piecewise linear function to calculate the output values), the compression ratio distortion performance is reduced by 0.488% in comparison with that in the solution in which Tanh is used to implement the non-linear operation after the convolution operation. In addition, the solution in this embodiment can reduce calculation time consumption and power consumption in the element-wise addition operation.

In this embodiment, when the preset value of the first PWL operation is the Leaky ReLU function, the quantity of segments of the second PWL operation is 6, and the channel dimension is not grouped (that is, the same piecewise linear function is used to calculate the output values for features of all the channels), the compression ratio distortion performance is reduced by 0.659% in comparison with that in the solution in which Tanh is used to implement the non-linear operation after the convolution operation. In addition, the solution in this embodiment can reduce calculation time consumption and power consumption in the element-wise addition operation.

Figure 18:
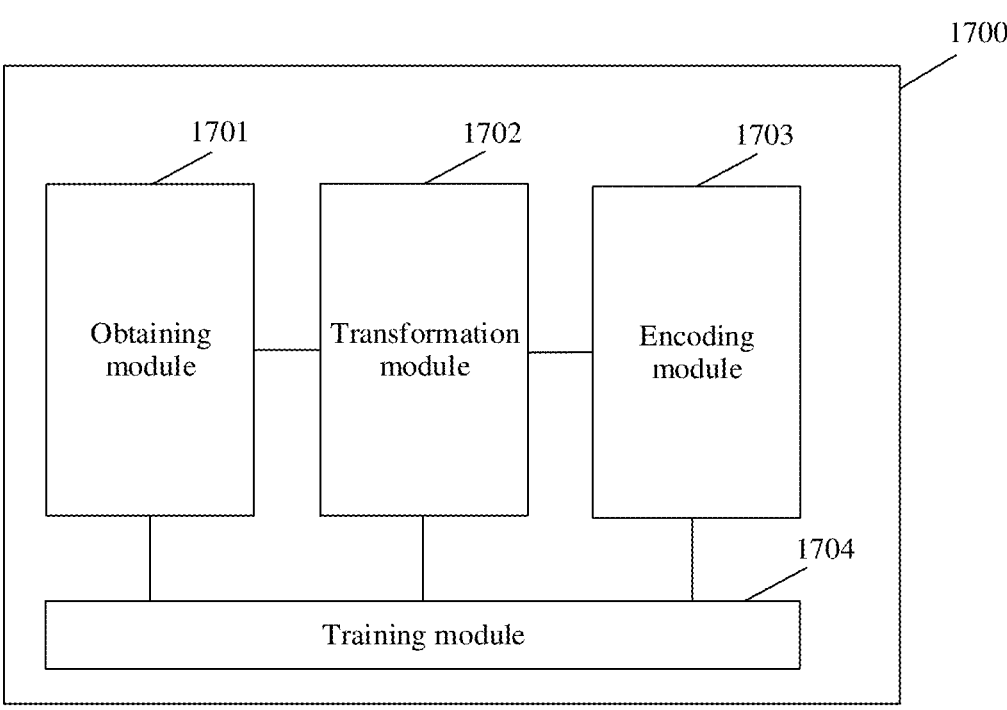
FIG. 18 is a schematic diagram of a structure of an example encoding apparatus 1700 according to an embodiment of this application.

FIG. 18 is a schematic diagram of a structure of an example encoding apparatus 1700 according to an embodiment of this application. As shown in FIG. 18, the apparatus 1700 in this embodiment may be used on an encoder side. The apparatus 1700 may include an obtaining module 1701, a transformation module 1702, an encoding module 1703, and a training module 1704. Specifically:

The obtaining module 1701 is configured to obtain a to-be-processed first image feature. The transformation module 1702 is configured to perform non-linear transformation processing on the first image feature to obtain a processed image feature, where the non-linear transformation processing sequentially includes a first non-linear operation, convolution processing, and an element-wise multiplication operation. The encoding module 1703 is configured to perform encoding based on the processed image feature to obtain a bitstream.

In a possible implementation, the transformation module 1702 is specifically configured to: perform the first non-linear operation on each feature value in the first image feature to obtain a second image feature; perform the convolution processing on the second image feature to obtain a third image feature, where a plurality of feature values in the third image feature correspond to a plurality of feature values in the first image feature; and perform the element-wise multiplication operation on the plurality of corresponding feature values in the first image feature and the third image feature to obtain the processed image feature.

In a possible implementation, the non-linear transformation processing further includes an element-wise addition operation after the element-wise multiplication operation.

In a possible implementation, the transformation module 1702 is specifically configured to: perform the first non-linear operation on each feature value in the first image feature to obtain a second image feature; perform the convolution processing on the second image feature to obtain a third image feature, where a plurality of feature values in the third image feature correspond to a plurality of feature values in the first image feature; perform the element-wise multiplication operation on the plurality of corresponding feature values in the first image feature and the third image feature to obtain a fourth image feature, where a plurality of feature values in the fourth image feature correspond to the plurality of feature values in the first image feature; and perform the element-wise addition operation on the plurality of corresponding feature values in the first image feature and the fourth image feature to obtain the processed image feature.

In a possible implementation, the non-linear transformation processing further includes a second non-linear operation between the convolution processing and the element-wise multiplication operation. The second non-linear operation is the same as or different from the first non-linear operation.

In a possible implementation, the non-linear operation includes piecewise linear mapping, for example, an ReLU, a LeakyReLU, PWL, and Abs. In another possible implementation, the non-linear operation includes a continuous function, for example, Tanh or Sigmoid. In another possible implementation, the non-linear operation includes a piecewise non-linear operation.

In a possible implementation, the apparatus further includes a training module 1704, configured to: construct a non-linear transformation unit in a training phase, where the non-linear transformation unit in the training phase includes a first non-linear operation layer, a convolution processing layer, an element-wise multiplication operation layer, and an element-wise addition operation layer; and perform training based on pre-obtained training data to obtain a trained non-linear transformation unit, where the trained non-linear transformation unit is used to implement the non-linear transformation processing.

The apparatus in this embodiment may be configured to perform the technical solution in the method embodiment shown in FIG. 9, and implementation principles and technical effects thereof are similar.

Figure 19:
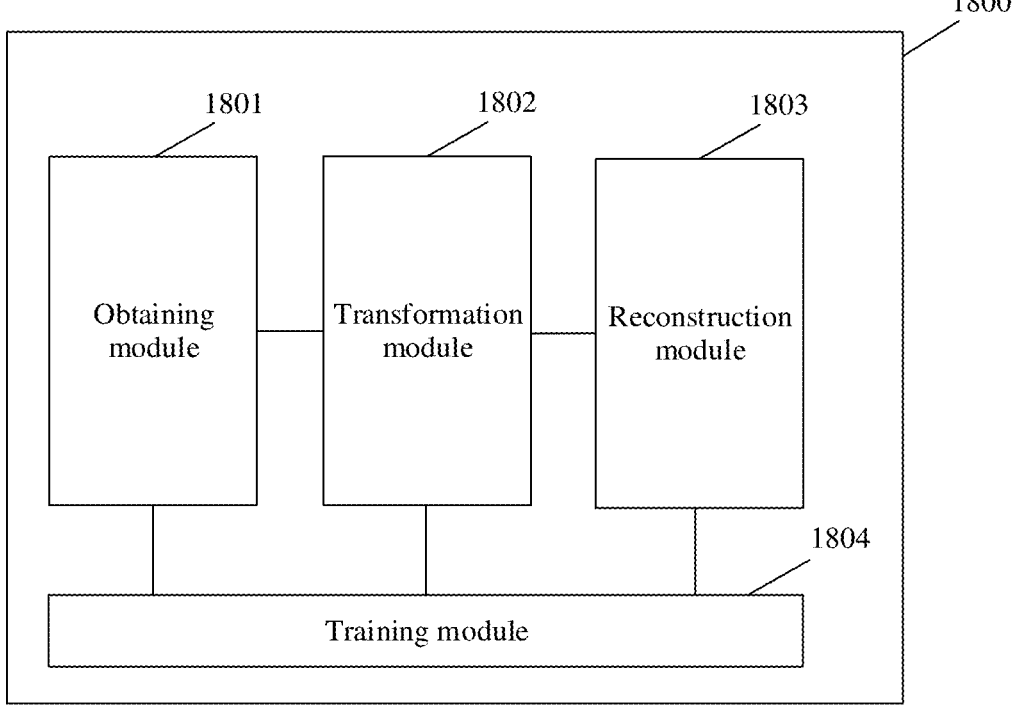
FIG. 19 is a schematic diagram of a structure of an example decoding apparatus 1800 according to an embodiment of this application.

FIG. 19 is a schematic diagram of a structure of an example decoding apparatus 1800 according to an embodiment of this application. As shown in FIG. 19, the apparatus 1800 in this embodiment may be used on a decoder side. The apparatus 1800 may include an obtaining module 1801, a transformation module 1802, a reconstruction module 1803, and a training module 1804. Specifically:

The obtaining module 1801 is configured to obtain a to-be-processed first image feature. The transformation module 1802 is configured to perform non-linear transformation processing on the first image feature to obtain a processed image feature, where the non-linear transformation processing includes a first non-linear operation, convolution processing, and an element-wise multiplication operation. The reconstruction module 1803 is configured to obtain a reconstructed image based on the processed image feature.

In a possible implementation, the transformation module 1802 is specifically configured to: perform the first non-linear operation on each feature value in the first image feature to obtain a second image feature; perform the convolution processing on the second image feature to obtain a third image feature, where a plurality of feature values in the third image feature correspond to a plurality of feature values in the first image feature; and perform the element-wise multiplication operation on the plurality of corresponding feature values in the first image feature and the third image feature to obtain the processed image feature.

In a possible implementation, the non-linear transformation processing further includes an element-wise addition operation after the element-wise multiplication operation.

In a possible implementation, the transformation module 1802 is specifically configured to: perform the first non-linear operation on each feature value in the first image feature to obtain a second image feature; perform the convolution processing on the second image feature to obtain a third image feature, where a plurality of feature values in the third image feature correspond to a plurality of feature values in the first image feature; perform the element-wise multiplication operation on the plurality of corresponding feature values in the first image feature and the third image feature to obtain a fourth image feature, where a plurality of feature values in the fourth image feature correspond to the plurality of feature values in the first image feature; and perform the element-wise addition operation on the plurality of corresponding feature values in the first image feature and the fourth image feature to obtain the processed image feature.

In a possible implementation, the non-linear transformation processing further includes a second non-linear operation between the convolution processing and the element-wise multiplication operation. The second non-linear operation is the same as or different from the first non-linear operation.

In a possible implementation, the non-linear operation includes piecewise linear mapping, for example, an ReLU, a LeakyReLU, PWL, and Abs. In another possible implementation, the non-linear operation includes a continuous function, for example, Tanh or Sigmoid. In another possible implementation, the non-linear operation includes a piecewise non-linear operation.

In a possible implementation, the training module 1804 is configured to: construct a non-linear transformation unit in a training phase, where the non-linear transformation unit in the training phase includes a first non-linear operation layer, a convolution processing layer, an element-wise multiplication operation layer, and an element-wise addition operation layer; and perform training based on pre-obtained training data to obtain a trained non-linear transformation unit, where the trained non-linear transformation unit is used to implement the non-linear transformation processing.

The apparatus in this embodiment may be configured to perform the technical solutions in the method embodiment shown in FIG. 14. An implementation principle and technical effects of the apparatus are similar to those of the method embodiment.

An embodiment of this application provides a bitstream. The bitstream is generated by a processor by performing any encoding method in the foregoing embodiments.

An embodiment of this application provides a bitstream storage apparatus, where the apparatus includes a receiver and at least one storage medium, the receiver is configured to receive a bitstream, and the at least one storage medium is configured to store a bitstream. The bitstream is a bitstream generated by any encoding method in the foregoing embodiments.

An embodiment of this application provides a bitstream transmission apparatus, where the apparatus includes a transmitter and at least one storage medium, the at least one storage medium is configured to store a bitstream, the bitstream is generated by a processor by performing any encoding method in the foregoing embodiments, and the transmitter is configured to send the bitstream to another electronic device. Optionally, the bitstream transmission apparatus further includes a receiver and a processor. The receiver is configured to receive a user request, and the processor is configured to: in response to the user request, select a target bitstream from a storage medium, and instruct the transmitter to send the target bitstream.

An embodiment of this application provides a bitstream distribution system, where the system includes at least one storage medium and a streaming media device, the at least one storage medium is configured to store at least one bitstream, and the at least one bitstream includes a bitstream generated according to any one of the implementations of the first aspect. The streaming media device is configured to obtain a target bitstream from the at least one storage medium and send the target bitstream to a terminal-side device, where the streaming media device includes a content server or a content distribution server.

An embodiment of this application provides a bitstream distribution system, where the system includes: a communication interface, configured to receive a request of a user for obtaining a target bitstream; and a processor, configured to determine a storage location of the target bitstream in response to the request of the user. The communication interface is further configured to send the storage location of the target bitstream to the user, so that the user obtains the target bitstream from the storage location of the target bitstream, where the target bitstream is generated by the processor by performing any encoding method in the foregoing embodiments.

In an implementation process, steps in the foregoing method embodiments can be implemented by using a hardware integrated logical circuit in the processor, or by using instructions in a form of software. The processor may be a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, or a discrete hardware component. The general-purpose processor may be a microprocessor, or the processor may be any conventional processor or the like. The steps of the methods disclosed in embodiments of this application may be directly presented as being performed and completed by a hardware encoding processor, or performed and completed by a combination of hardware and a software module in an encoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The memory in the foregoing embodiments may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of embodiments of this application.

It may be clearly understood by a person skilled in the art that, for the purpose of convenient and brief description, for a detailed working process of the foregoing system, apparatus, and unit, refer to a corresponding procedure in the foregoing method embodiments.

In the several embodiments provided in embodiments of this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of embodiments of this application essentially, or the part contributing to the conventional technology, or some of the technical solutions may be implemented in a form of a software product. The computer software product is stored in a storage medium, and includes several instructions for instructing a computer device (a personal computer, a server, or a network device) to perform all or some of the steps of the methods described in embodiments of this application. Alternatively, the computer software product may be transferred from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), or a semiconductor medium (for example, a solid state disk (SSD), a read-only memory (ROM), or a random access memory (RAM)).

The foregoing descriptions are merely non-limiting examples of specific implementations, and are not intended to limit the protection scope, which is intended to cover any change or replacement readily determined by a person of ordinary skill in the art. Therefore, the claims shall define the protection scope.

What is claimed is:

1. An image encoding method, comprising:
obtaining a to-be-processed first image feature;
performing non-linear transformation processing on the to-be-processed first image feature to obtain a processed image feature, wherein the non-linear transformation processing sequentially comprises a first non-linear operation, convolution processing, and an element-wise multiplication operation; and
performing encoding based on the processed image feature to obtain a bitstream,
wherein the performing non-linear transformation processing on the to-be-processed first image feature to obtain a processed image feature comprises;
performing the first non-linear operation on each feature value in the to-be-processed first image feature to obtain a second image feature;
performing the convolution processing on the second image feature to obtain a third image feature, wherein a plurality of feature values in the third image feature correspond to a plurality of feature values in the to-be-processed first image feature; and
performing the element-wise multiplication operation on the plurality of corresponding feature values in the to-be-processed first image feature and the third image feature to obtain the processed image feature.

2. The method according to claim 1, wherein the first non-linear operation comprises an activation function of rectified linear unit series, Sigmoid, Tanh, or piecewise linear mapping.

3. The method according to claim 1, further comprising:
constructing a non-linear transformation unit in a training phase, wherein the non-linear transformation unit in the training phase comprises a first non-linear operation layer, a convolution processing layer, and an element-wise multiplication operation layer; and
performing training based on pre-obtained training data to obtain a trained non-linear transformation unit for implementing the non-linear transformation processing.

4. An image encoding device, comprising:
one or more processors; and
a non-transitory computer-readable storage medium, coupled to the one or more processors and storing instructions, which, when executed by the one or more processors, cause the image encoding device to perform operations comprising:
obtaining a to-be-processed first image feature;
performing non-linear transformation processing on the to-be-processed first image feature to obtain a processed image feature, wherein the non-linear transformation processing sequentially comprises a first non-linear operation, convolution processing, and an element-wise multiplication operation; and
performing encoding based on the processed image feature to obtain a bitstream,
wherein the performing non-linear transformation processing on the to-be-processed first image feature to obtain processed image feature comprises:
performing the first non-linear operation on each feature value in the to-be-processed first image feature to obtain a second image feature;
performing the convolution processing on the second image feature to obtain a third image feature, wherein a plurality of features values in the third image feature correspond to a plurality of feature values in the to-be-processed first image feature, and
performing the element-wise multiplication operation on the plurality of corresponding feature values in the to-be-processed first image feature and the third image feature to obtain the processed image feature.

5. The device according to claim 4, wherein the first non-linear operation comprises an activation function of rectified linear unit series, Sigmoid, Tanh, or piecewise linear mapping.

6. The device according to claim 4, wherein the operations further comprise:

constructing a non-linear transformation unit in a training phase, wherein the non-linear transformation unit in the training phase comprises a first non-linear operation layer, a convolution processing layer, and an element-wise multiplication operation layer; and performing training based on pre-obtained training data to obtain a trained non-linear transformation unit for implementing the non-linear transformation processing.

7. A non-transitory computer-readable storage medium, comprising instructions, wherein when the instructions are run on a computer, cause the computer to perform operations comprising:

obtaining a to-be-processed first image feature;

performing non-linear transformation processing on the to-be-processed first image feature to obtain a processed image feature, wherein the non-linear transformation processing sequentially comprises a first non-linear operation, convolution processing, and an element-wise multiplication operation; and performing encoding based on the processed image feature to obtain a bitstream, wherein the performing non-linear transformation processing on the to-be-processed first image feature to obtain a processed image feature comprises:

performing the first non-linear operation on each feature value in the to-be processed first image feature to obtain a second image feature;

performing the convolution processing on the second image feature to obtain a third image feature, wherein a plurality of feature values in the third image feature correspond to a plurality of feature values in the to-be-processed first image feature; and performing the element-wise multiplication operation on the plurality of corresponding feature values in the to-be-processed first image feature and the third image feature to obtain the processed image feature.

8. The non-transitory computer-readable storage medium according to claim 7, wherein the first non-linear operation comprises an activation function of rectified linear unit series, Sigmoid, Tanh, or piecewise linear mapping.

9. The non-transitory computer-readable storage medium according to claim 7, wherein the operations further comprise:

constructing a non-linear transformation unit in a training phase, wherein the non-linear transformation unit in the training phase comprises a first non-linear operation layer, a convolution processing layer, and an element-wise multiplication operation layer; and performing training based on pre-obtained training data to obtain a trained non-linear transformation unit for implementing the non-linear transformation processing.

* * * * *